US011377356B2

(12) United States Patent
He et al.

(10) Patent No.: US 11,377,356 B2
(45) Date of Patent: Jul. 5, 2022

(54) SCALABLE FABRICATION OF PRISTINE HOLEY GRAPHENE NANOPLATELETS VIA DRY MICROWAVE IRRADIATION

(71) Applicant: Rutgers, The State University of New Jersey, New Brunswick, NJ (US)

(72) Inventors: Huixin He, Newark, NJ (US); Keerthi Savaram, Harrison, NJ (US); Qingdong Li, Newark, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 251 days.

(21) Appl. No.: 16/622,691

(22) PCT Filed: Jun. 14, 2018

(86) PCT No.: PCT/US2018/037524
§ 371 (c)(1),
(2) Date: Dec. 13, 2019

(87) PCT Pub. No.: WO2018/232109
PCT Pub. Date: Dec. 20, 2018

(65) Prior Publication Data
US 2020/0123011 A1 Apr. 23, 2020

Related U.S. Application Data

(60) Provisional application No. 62/519,500, filed on Jun. 14, 2017.

(51) Int. Cl.
*C01B 32/192* (2017.01)
*C01B 32/194* (2017.01)

(52) U.S. Cl.
CPC .......... *C01B 32/192* (2017.08); *C01B 32/194* (2017.08); *C01B 2204/04* (2013.01); *C01B 2204/22* (2013.01); *C01P 2006/16* (2013.01)

(58) Field of Classification Search
CPC . C01B 32/192; C01B 32/194; C01B 2204/04; C01B 2204/22; C01B 32/19;
(Continued)

(56) References Cited

U.S. PATENT DOCUMENTS 8,747,623 B2 6/2014 Zhamu et al.
9,567,225 B2 2/2017 Lin et al.
(Continued)

FOREIGN PATENT DOCUMENTS

WO 20150131933 A1 9/2015
WO 2015157280 A1 10/2015
(Continued)

OTHER PUBLICATIONS

Zou, Yun, et al. "Control of electronic transport in nanohole defective zigzag graphene nanoribbon by means of side alkene chain." RSC advances 5.25 (2015): 19152-19158.*
(Continued)

*Primary Examiner* — Richard M Rump
(74) *Attorney, Agent, or Firm* — Fox Rothschild LLP

(57) ABSTRACT

Disclosed are the methods for fabricating holey graphene nanoplatelets using microwave irradiation to treat a dry graphite powder. In particular, the methods can be used to treat graphite intercalation compounds either with or without partial oxidation to obtain holey graphene nanoplatelets with predetermined hole size, hole edge shape, thickness and lateral dimension. The method does not involve any toxic reagents or metal-containing compounds, and without generating toxic byproducts, thus enabling a variety of eco-friendly applications.

19 Claims, 13 Drawing Sheets

SCHEME 4

(58) Field of Classification Search
CPC ............. C01B 2204/02; C01B 2204/20; C01P 2006/16
See application file for complete search history.

(56) References Cited

U.S. PATENT DOCUMENTS

| | | | |
|---|---|---|---|
| 2013/0040283 A1* | 2/2013 | Star | B82Y 30/00 435/5 |
| 2013/0266501 A1 | 10/2013 | He et al. | |
| 2016/0194460 A1* | 7/2016 | Humfeld | C08J 5/042 428/408 |
| 2016/0339160 A1* | 11/2016 | Bedworth | B01D 71/021 |
| 2016/0368772 A1 | 12/2016 | Chen et al. | |
| 2016/0368773 A1 | 12/2016 | Arnold et al. | |

FOREIGN PATENT DOCUMENTS

| | | | |
|---|---|---|---|
| WO | 2016191564 A1 | 12/2016 | |
| WO | 2018044762 A1 | 3/2018 | |

OTHER PUBLICATIONS

Mahmood, Javeed, et al. "Nitrogenated holey two-dimensional structures." Nature communications 6.1 (2015): 1-7.*

Savaram et al: "Synergy of Oxygen and a Piranha Solution for Eco-Friendly Production of Highly Conductive Graphene Dispersions", Green Chemistry, Nov. 19, 2014, vol. 17, pp. 869-881.

Voiry, et al; "High-Quality Graphene Via Microwave Reduction of Solution-Exfoliated Graphene Oxide", Science, Sep. 23, 2016, vol. 353, Issue 6306, pp. 1413-1416.

Alsharaeh, et al: Novel Synthesis of Holey Reduced Graphene Oxide (HRGO) by Microwave Irradiation Method for Anode in Lithium-Ion Batteries, Jul. 26, 2016, Scientific Reports, 6:29854, pp. 1-13.

* cited by examiner

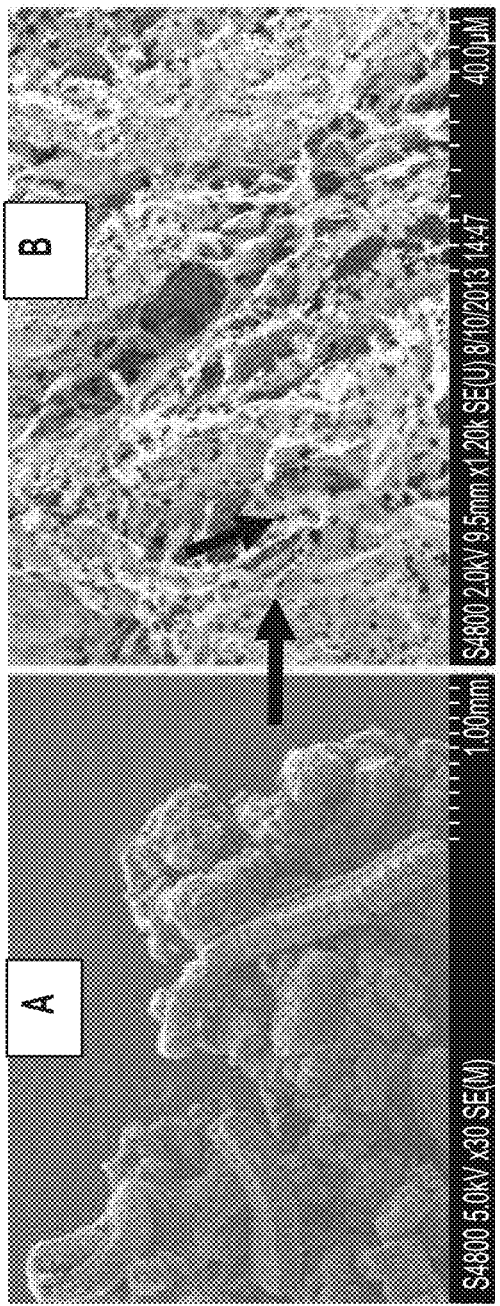 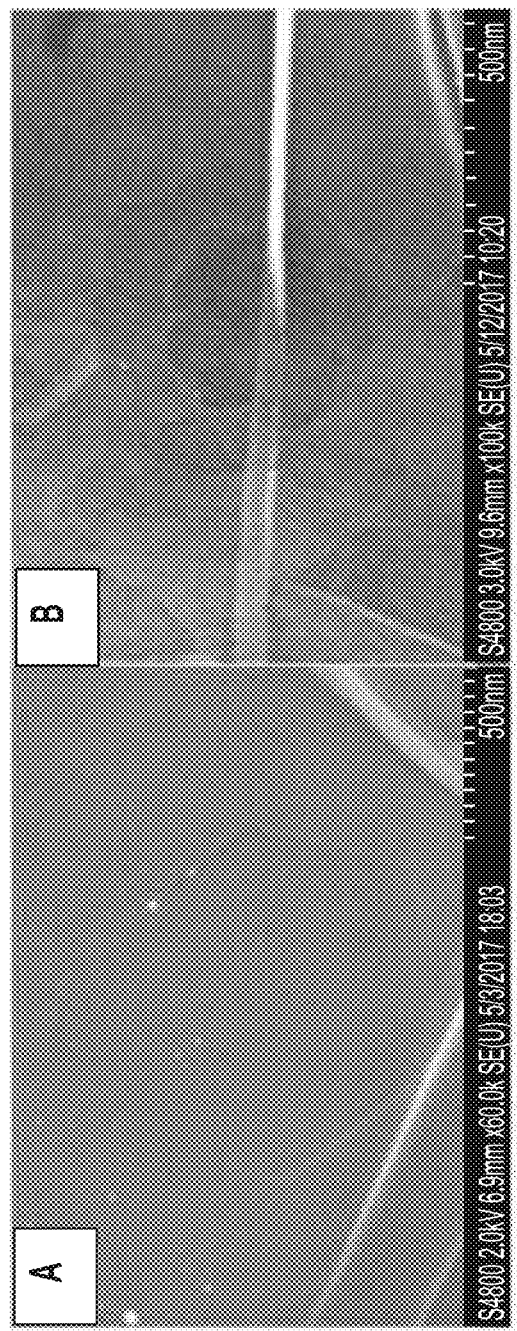
Figure 3
Figure 4

SCHEME 3

SCHEME 4

SCALABLE FABRICATION OF PRISTINE HOLEY GRAPHENE NANOPLATELETS VIA DRY MICROWAVE IRRADIATION

CROSS-REFERENCE TO RELATED APPLICATIONS

The present application is the U.S. National Phase of International Patent Application Serial No. PCT/US18/37524, filed Jun. 14, 2018, which claims the benefit of priority under 35 U.S.C. § 119(e) of U.S. Provisional Application Ser. No. 62/519,500, filed Jun. 14,2017. The entire disclosures of the applications noted above are incorporated herein by reference.

GOVERNMENT GRANT INFORMATION

This invention was made under government support (National Science Foundation grant no. CBET-1438493). Accordingly, the U.S. Government has certain rights in this invention.

FIELD OF THE INVENTION

The present invention generally relates to a novel, rapid, eco-friendly method to fabricate holey graphene nanoplatelets using dry microwave irradiation. In particular, the method can be used to treat graphite intercalation compounds either with or without partial oxidation to obtain holey graphene nanoplatelets with predetermined hole size, geometrical structure of hole edges, thickness and lateral dimension.

BACKGROUND OF THE INVENTION

Graphene is a flat monolayer of carbon atoms tightly packed into a two-dimensional (2D) honeycomb lattice and is a basic building block for graphitic materials of all other dimensionalities. It can be wrapped up into 0D fullerenes, rolled into 1D nanotubes or stacked into 3D graphite. Due to its excellent electronic, thermal and mechanical properties, and its large surface area and low mass, graphene holds great potential for a range of applications. Examples include energy and hydrogen storage devices, inexpensive, flexible macroelectronic devices, and mechanically reinforced conductive coatings including films for electromagnetic interference (EMI) shielding in aerospace applications.

Holey graphene, referred to graphene sheets with nanoholes in their basal plane, recently attracts increasing interest from both fundamental and practical application point of views. Its unique properties lead to a wide range of applications, which cannot be achieved by its non-holey counterpart. It is important to note that holey graphene is different from porous graphene. In porous graphene, the porous structures are formed by creating physical spaces between intact graphene sheets, while holey graphene is synthesized by etching through the graphene sheets to form holes in their basal planes. In bulk 3D materials assembled from holey graphene materials for practical applications, both nanoholes and pores existed. The existence of the nanoholes provides desired "short-cuts" for efficient mass transport across the graphene plane and ultimate access to the inner surfaces. The existence of holes in graphene increases the accessible surface area (ASA) of graphene assemblies. Most importantly, generating nanoholes also naturally transforms a large number of in-plane atoms into edge atoms. It has been theoretically predicted and experimentally demonstrated that the edges of graphene sheets have different electronic states and chemical functionalities from their basal planes, which render them unique molecule and ionic absorption capability, dramatically increased quantum capacitance and electrochemical double layer capacitances. Recent years have witnessed the wide applications of holey graphene in gas storage/separation, oil absorption, photonic devices, catalysis, sensing, electrochemical energy generation, and storage. In particular, the recent development in compressible, dense, ultrathick electrode architectures with high mass loading can deliver high areal capacity and high-rate capability, which represents one of the critical steps forward in using holey graphene-based materials toward practical applications.

Due to the wide range of applications, various approaches have been developed for the production of holey graphene sheets. Bottom-up approaches based on chemical vapor deposition (CVD) methods, and top-down photo, electron or plasma etching of graphene utilize various templates, which provide good control over the sizes, shapes, and the positions of holes. These strategies start with high-quality graphene and generate holes on the basal planes of graphene while leaving other parts of the basal planes intact. This type of holey graphene is referred as pristine holey graphene to differentiate from those holey graphene materials with a large number of defects (i.e., oxygen-containing groups, 5-8 member rings, sp3 carbons) on the basal planes. However all these methods are designed for electronic and spintronic device applications, some of them even need a solid substrate to support the graphene sheets during the hole drilling process, so suffering from high cost and difficulties in scaling up to produce a large quantity of materials for bulk applications.

On the other hand, the bulk chemical etching approaches, such as KOH etching, $H_3PO_4$ activation, $HNO_3$ oxidation, hot steam etching, enzymatic oxidation, and oxidative etching with or without catalytic nanoparticles, have advantages for large-scale and cost-effective synthesis. Most of these chemical etching based-approaches require graphene oxide (GO) or reduced graphene oxide (rGO) as a starting material, which contains various defects on their basal planes. During the hole generating process, some of these defects are partially gasified or etched away. While some of them may evolve to other defective forms such as 5-8 member rings, carbonyl, ether, and lactose groups, which are difficult to be removed even after high-temperature annealing. Further, fabrication of the GO and/or rGO starting materials usually takes hours to days, depending on the oxidation methods applied. Recently, we developed a one-step-one-pot microwave-assisted approach to rapidly, directly and controllably fabricate holey GO from graphite powder. However, this one-step-one pot microwave-assisted approach, similar to the widely used graphite oxidation methods, such as Staudenmaier, Hofmann, Hummers, or Tour's methods, also utilize metal-containing oxidants, such as $KMnO_4$ and/or $KClO_3$. Trace residues of these oxidants and metal ions used or generated in these approaches can further participate in undesired reactions and can be detrimental to a wide range of applications. However, purification of GO remains a challenge mainly due to its tendency of gelation. Even though these metal ions are water soluble, they were trapped due to the gelation tendency of GO, causing the GO product to be highly flammable. Therefore, extensive cleaning and purification steps are required, making industrial-scale production expensive and time-consuming. Therefore the fundamental molecular basis in fabricating holey graphene materials determined that the existence of various defects on their basal planes and possible metal residues, which not only decrease their electrical and thermal conductivity, also negatively influence the chemical and thermal stability of holey graphene materials for their long-term practical applications. There are no scalable approaches reported to date which is capable of mass production of highly conductive and chemically stable pristine holey graphene materials without involving metallic containing compounds and at low cost for practical bulk applications. Furthermore, none of the approaches could generate pristine holey graphene materials with controlled geometric structures, such as zigzag or armchair, of their hole edges.

Therefore, a solution that overcomes the above-described inadequacies and shortcomings in the process of producing holey graphene or holey graphene nanoplatelets containing more than one layer of graphene nano sheets while keeping the rest of the basal plane nearly intact, at low cost and in an eco-friendly manner, is desired. In particular, it would be desirable to produce holey graphene nanoplatelets with a large number of zigzag edges associated with the holes.

SUMMARY OF THE INVENTION

This disclosure provides a method for fabricating holey graphene nanoplatelets. The method includes subjecting partially oxidized graphite intercalation compounds (PO-GICs), oxygen intercalated graphite intercalation compounds (OI-GICs) or commercial expandable graphite (CEG) to one or more microwave irradiation treatments to generated holey graphene nanoplatelets. The generated holey graphene nanoplatelets include one or more expanded graphene sheets having a plurality of holes on the basal planes thereof.

In preparing the partially oxidized graphite intercalation compounds (PO-GICs), the method may include adding graphite flakes to a mixture of ammonium persulfate and sulfuric acid to form a reversible graphite intercalation compound and purging the mixture containing the reversible graphite intercalation compound with oxygen gas. The method may further include heating the mixture to obtain the partially oxidized graphite intercalation compounds (PO-GICs).

In preparing the partially oxidized graphite intercalation compounds (PO-GICs), the method may include exposing graphite flakes to a mixture of hydrogen peroxide and sulfuric acid.

In preparing the oxygen intercalated graphite intercalation compounds (OI-GICs), the method may include adding graphite flakes to a mixture of ammonium persulfate and sulfuric acid to form a reversible graphite intercalation compound and purging the mixture containing the reversible graphite intercalation compound with oxygen gas.

In some embodiments, in preparing the partially oxidized graphite intercalation compounds (PO-GICs) or the oxygen intercalated graphite intercalation compounds (OI-GICs), the method may include purging the mixture containing the reversible graphite intercalation compound with oxygen gas at a rate of between about 90 ml/min and about 120 ml/min for a period of between about 30 minutes and about 120 minutes.

In some embodiments, one or more parameters of the microwave irradiation treatments are selected to induce a Joule heating mechanism or a combination of a Joule heating mechanism and a micro-plasma etching mechanism to obtain a predetermined number of holes of predetermined size and geometry on the basal planes of the expanded graphene sheets, one or more parameters including duration, power, and intervals of microwave irradiation pulses.

In some embodiments, the microwave irradiation treatments include one or more microwave irradiation pulses at the power of between about 10 Watt and about 300 Watt for a period of about 3 seconds and about 150 seconds.

In some embodiments, the microwave irradiation treatments further include (1) a first microwave irradiation to remedy existing defects on the basal planes of the expanded graphene sheets; (2) a second microwave irradiation to generate baby holes on the basal planes of the expanded graphene sheets; and (3) a third microwave irradiation to obtain said plurality of holes by fine-tuning the generated baby holes, such that the expanded graphene sheets of the holey graphene nanoplatelets have a predetermined number of holes of predetermined size and geometry on the basal planes of the expanded graphene sheets.

In some embodiments, said plurality of holes have a geometrical structure of hole edges predominantly in a zigzag configuration. In some embodiments, said plurality of holes are uniformly distributed across the basal planes of the expanded graphene sheets. In some embodiments, the mean hole size of said plurality of holes is about 5 to about 500 nm. In some embodiments, the mean thickness of the holey graphene nanoplatelets is from about 2 nm to about 14 nm. In some embodiments, the mean lateral dimension of the holey graphene nanoplatelets is from about 0.5 µm to about 20 µm. In some embodiments, the holey graphene nanoplatelets have a conductivity between about 7000 S/m and about 100,000 S/m. In some embodiments, the holey graphene nanoplatelets have a C:O molar ratio between 15:1 and 55:1.

This disclosure also provides holey graphene nanoplatelets prepared by the above-disclosed methods. In some embodiments, said plurality of holes having a geometrical structure of hole edges predominantly in a zigzag configuration. In some embodiments, the holey graphene nanoplatelets have a conductivity between about 7000 S/m and about 100,000 S/m. In some embodiments, the holey graphene nanoplatelets have a C:O ratio between 15:1 and 55:1.

This disclosure additionally provides a product including the holey graphene nanoplatelets. The product may be electrodes of batteries or electrodes of capacitors.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. Also, in the drawings, the like reference characters refer to the same parts throughout the different views. The drawings depict only typical embodiments of the present disclosure and, therefore, are not to be considered limiting in scope.

FIG. 1D shows a representative atomic resolution TEM picture of the expanded graphene, which clearly demonstrates that the majority of the defects were fixed and the majority of the graphene sheets have the $sp^2$ carbon structures on the basal planes. The edges are more etched due to their high reactivity. FIGS. 1A, 1B, 1C, and 1D are collectively referred to as FIG. 1.

FIGS. 2A, 2B, 2C, and 2D are collectively referred to as FIG. 2.

FIGS. 3A and 3B (collectively "FIG. 3") show SEM pictures of the exfoliated (expanded) graphene from PO-GIC prepared by a one-step interaction process with Piranha solutions. FIG. 3B is an SEM image with high magnification clearly that shows large holes, which penetrate through the entire graphene nanoplatelets.

FIG. 4A shows the hole with hexagonal shaped, 120-degree angles are formed with several edges, indicating they are zigzag edges or armchair edge. FIG. 4B shows a hole with a circular shape, which indicates that edges of the holes are a mixture of zigzag and armchair. FIGS. 4A and 4B are collectively referred to as FIG. 4.

FIGS. 6A and 6B are collectively referred to as FIG. 6.

FIGS. 7A, 7B, 7C, 7D, 7E, and 7F are collectively referred to as FIG. 7.

FIG. 8A shows PO-GIC (curve 1) and PO-GIC-H (curve 2); and FIG. 8B shows PO-GIC-HE with EPR spectrum of $Mn^{2+}$: MGO standard consisting of six sharp lines. The sextet line arises from the hyperfine splitting of the $Mn^{2+}$ ions. Microwave power—2 mW. Magnetic field modulation amplitude—2 mT for both broad EPR lines of samples with holes and holes/edges and 0.3 mT for the upper single narrow line.

FIGS. 9A and 9B are collectively referred to as FIG. 9.

FIGS. 11A and 11B show the PO-GIC-HE can catalytically reduce molecular oxygen to hyperoxide ($H_2O_2$), an industrially important green oxidant can be efficiently generated in basic solutions. FIGS. 11C and 11D show the PO-GIC-HE can catalytically reduce molecular oxygen to directly water with a four-electron pathway, which is critical for fuel cell applications.

FIGS. 12A, 12B, 12C, and 12D are collectively referred to as FIG. 12.

DETAILED DESCRIPTION OF THE INVENTION

This disclosure is not limited to the particular systems, methodologies or protocols described, as these may vary. The terminology used in this description is to describe the particular versions or embodiments only and is not intended to limit the scope.

This present invention provides a novel, rapid, eco-friendly mass production approach to solve the problems mentioned above, so that selective and controllable generation of nanoholes can be achieved while leaving other parts of the graphene basal plane largely intact. With optimized experimental parameters, the size and shape of the holes, the thickness and the lateral dimensions of the highly conductive holey graphene nanoplatelets can be tuned to accommodate a wide range of applications. Furthermore, their hole edges can be controlled to be rich in zigzag geometry, which is the preferred structure for catalytic and spintronic applications. This geometry can be modified by post-chemical treatments for tailored applications.

The present invention provides at least the following advantages over the previously reported methods: (1) the holey graphene structures are rich in holes ranging from nanometer to micrometers. More importantly, their basal planes are nearly free of other defects. This feature ensures the reservation of the outstanding electric and thermal transport properties and chemical inertness of the basal plane of graphene; (2) eco-friendly, no metal-containing compounds involved in the production; (3) fast (several seconds); and (4) low energy consuming. In addition, compared to the wet microwave chemistry approaches, additional advantages were brought in: (a) the issues, such as safety and corrosion to microwave equipment, which are associated with the usage of strong acids and oxidants in the microwave oven are naturally avoided, further minimized environmental impact as well as eliminating the cost of waste/toxic material collection and treatment; and (b) Since the dry approach is a solvent-free process, all the microwave energy can be efficiently absorbed only by the reactant. Accordingly, the required microwave energy is much lower and the irradiation time for the production is even shorter; therefore the dry production process is much faster and further decreasing energy-consuming. It largely simplifies the design for continuous large-scale and cost-effective production of high-quality holey graphene nanoplatelets with controlled structures. The as-fabricated product is in dry powder-like form. So the current technologies to make electrodes for both Li-ion batteries and double layer capacitors can be directly applied. The product can also be easily dispersed in organic solvents with high concentrations for other applications.

Figure 13:
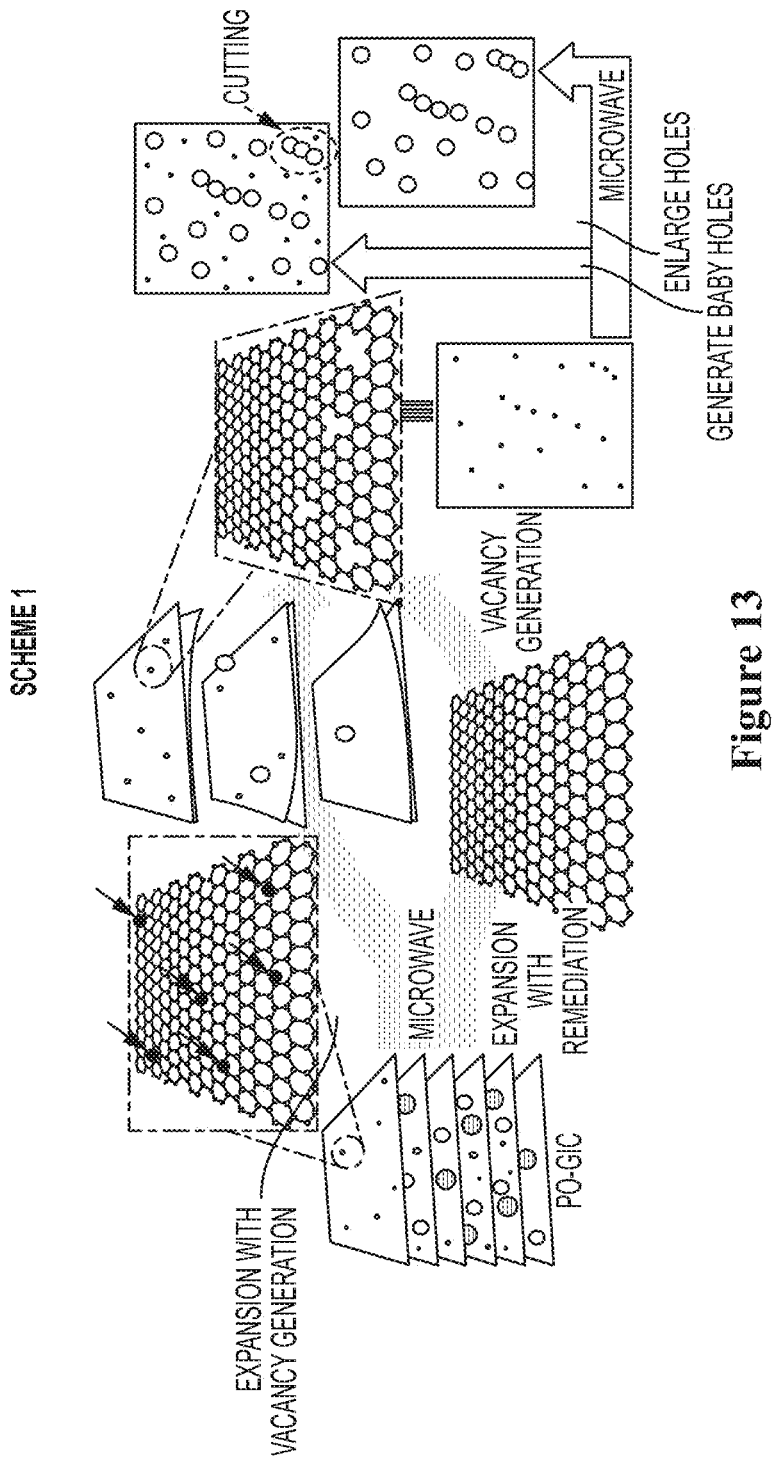
FIG. 13 shows Scheme 1 for the principle to fabricate holey graphene nanoplatelets with controlled sizes of holes, thickness, and lateral dimension of the nanoplatelets.

The working principle of this approach was shown in FIG. 13, Scheme 1. A GIC is subjected to microwave irradiation, the functional groups with the associated carbon atoms are selectively gasified, which leads rapid exfoliation or expansion of the GIC, in the same time, vacancies or nanometer holes are also generated on the basal planes. Alternatively, the first microwave irradiation pulse may be used to remedy the defects during expansion. Then the second microwave irradiation pulse will be designed to generate holes on the basal planes of the exfoliated (expanded) graphene sheets. With more microwave irradiation pulses, the holes will be enlarged. With high enough power, some baby holes can be generated at the same time. With extension period of microwave irradiation, the graphene sheets can be fractured into small ones with two different molecular mechanisms, which would lead us to control the lateral dimensions of the holey graphene nanoplatelets. The first mechanism is possibly due to enlarging and merging of the generated holes, which eventually lead to fracture the graphene sheets to small ones. It is also possible that new oxidation reactions occur due to the generation of new functional groups such as epoxy groups on the basal planes or edges. These new reactions could lead to fracture the graphene sheets to small ones via an unzipping mechanism.

Figure 14:
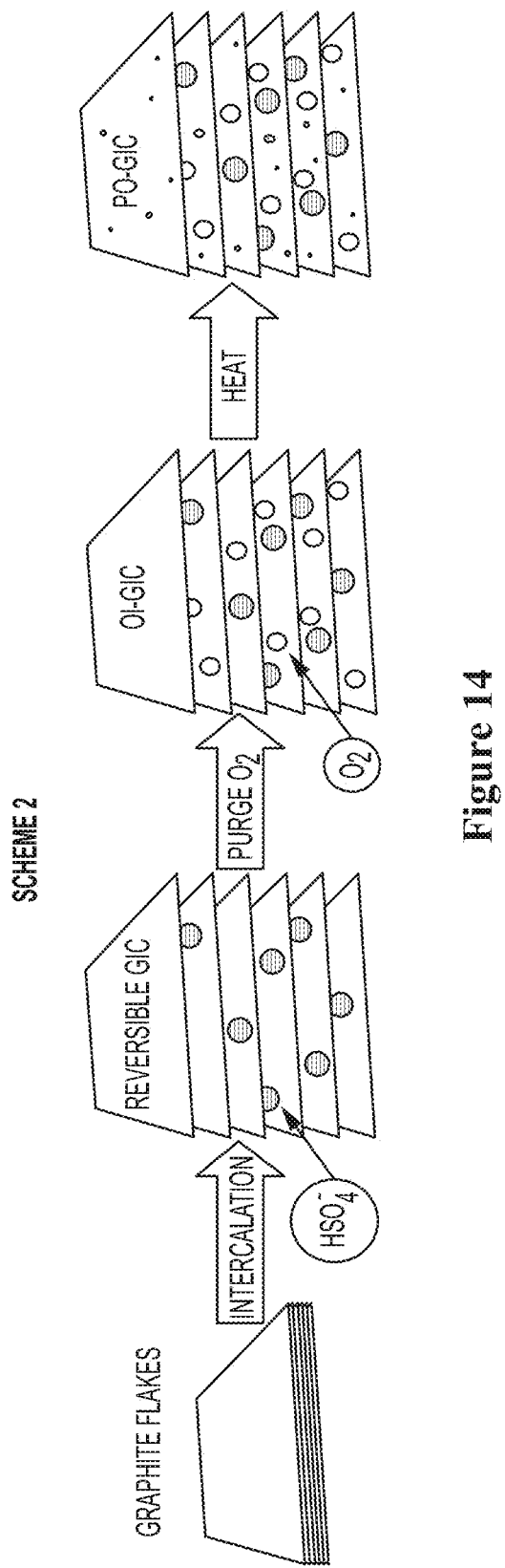
FIG. 14 shows Scheme 2 for a partial oxidation approach to fabricate holey graphene nanoplatelets with controlled sizes of holes. Reversible $H_2SO_4$-GICs were formed by exposing graphite particles to a mixture of sulfuric acid and ammonium persulfate. $O_2$ was purged into this solution and then heat to generate partially oxidized GICs (PO-GICs). After cleaning and drying, the PO-GICs are subjected to designed microwave irradiation patterns as described in Scheme 1 to control the structure of the holey graphene nanoplatelets.
Figure 15:
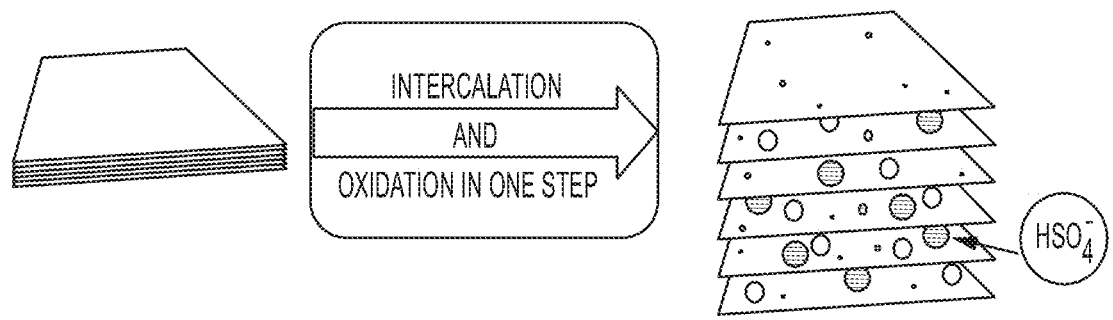
FIG. 15 shows Scheme 3 for a partial oxidation approach to fabricate holey graphene nanoplatelets with controlled sizes of holes. Stable GICs with partial oxidation was achieved in one step by using Piranha solutions (a mixture of hydrogen peroxide and sulfuric acid) as intercalation agents. After cleaning and drying, the stable GIC is subjected to designed microwave irradiation patterns as described in Scheme 1 to control the structure of the holey graphene nanoplatelets.

In some scenarios, the starting materials subjected to microwave irradiation are partially oxidized GICs (PO-GIC), in which point defects distributed across the entire graphene sheets and each graphene sheets in the entire GIC particles (FIG. 14 for Scheme 2 and FIG. 15 for Scheme 3). The starting material can also be oxygen intercalated GICs (OI-GIC), in which molecular oxygen was intercalated between the galleries of the graphene sheets (FIG. 16 for Scheme 4) or the commercially available expandable GICs.

In some scenarios, holey graphene nanoplatelets with controlled sizes of holes are fabricated by a partial oxidation approach shown in FIG. 14. Reversible $H_2SO_4$-graphite intercalation compounds (GICs) are formed by exposing graphite particles to a mixture of sulfuric acid and ammonium persulfate. With different intercalation time, different stages of GIC can be obtained. The enlarged distance between the individual graphene sheets and the positive charges formed on their surfaces allow the purged molecular oxygen intercalating into the gallery of the graphene sheets in the GIC, which is named as OI-GIC. To get partial oxidized GICs, referred to as PO-GIC, then the OI-GIC solution was heated in an oil bath. Different heating temperature and periods could control the level of oxidation, the amount and types of oxygen-containing functional groups (also referred as to defects herein), highlighted in FIGS. 13, 14, and 15 with arrows.

In some scenarios, holey graphene nanoplatelets with controlled sizes of holes are fabricated by a partial oxidation approach illustrated in FIG. 15. Stable GICs with partial oxidation are formed in one step by using Piranha solutions (a mixture of hydrogen peroxide and sulfuric acid) as intercalation agents. Piranha solutions with different volume ratios of hydrogen peroxide and sulfuric acid, and the intercalation periods can be used to control the level of oxidation, the amount and types of oxygen-containing functional. After cleaning and drying, the PO-GICs were subjected to microwave irradiation.

Figure 16:
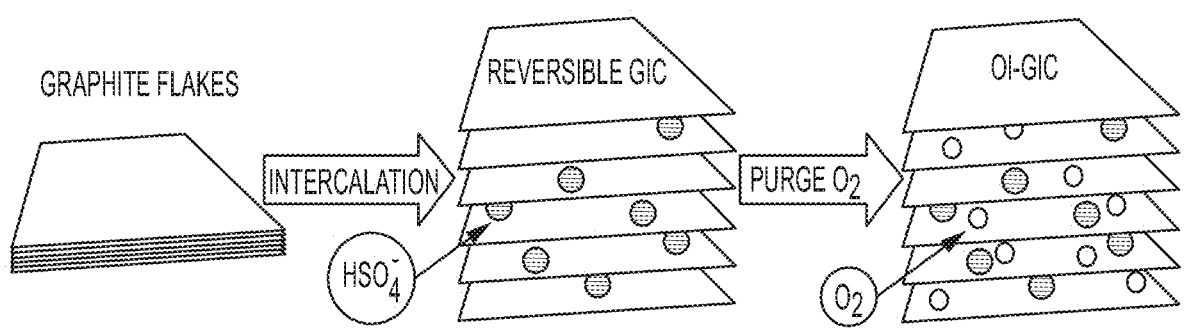
FIG. 16 shows Scheme 4 for the partial oxidation approach to fabricate holey graphene nanoplatelets with controlled sizes of holes. A reversible $H_2SO_4$-GIC is formed by exposing graphite particles to a mixture of sulfuric acid and ammonium persulfate. OI-GIC is prepared by purging molecular oxygen over GIC. After cleaning and drying, the OI-GIC is subjected to designed microwave irradiation patterns as described in Scheme 1 to control the structure of the holey graphene nanoplatelets.

In some scenarios, reversible $H_2SO_4$-GICs are formed by exposing graphite particles to a mixture of sulfuric acid and ammonium persulfate (FIG. 16). With different intercalation time, different stages of GIC can be obtained. The enlarged distance between the individual graphene sheets and the positive charges formed on their surfaces allow the purged molecular oxygen intercalating into the gallery of the graphene sheets in the GIC, which is named as OI-GIC (FIG. 16, Scheme 4). After cleaning and drying the OI-GIC were subjected to microwave irradiation with the designed microwave patterns described in FIG. 13, scheme 1 to generate the desired holey graphene nanoplatelets.

In some scenarios, the mixture of sulfuric acid and ammonium persulfate for treating graphite particles is prepared by mixing sulfuric acid ($H_2SO_4$, 98%) and ammonium persulfate (($NH_4$)$_2$$S_2$$O_8$) at a weight ratio between 1:1 and 100:1, preferably between 10:1 and 50:1, and more preferably between 15:1 and 30:1. The ratio for sulfuric acid and graphite is between 500:1 and 10:1, preferably between 300:1 and 30:1, more preferably between 150:1 and 50:1 to produce reversible sulfuric acid-based GICs. Preferably, the graphite particles are exposed to such a mixture at room temperature for 2 to 12 hours, preferably 6 hours.

In some scenarios, the mixture of sulfuric acid and hydrogen peroxide for treating graphite particles is prepared by mixing sulfuric acid ($H_2SO_4$, 98%) and hydrogen peroxide at a volume ratio between 3:1 and 30:1, preferably between 5:1 and 20:1, and more preferably about 15:1. Preferably, the graphite particles are exposed to such a mixture at room temperature for 15 minutes to 6 hours, more preferably 2 hours.

The GICs prepared from the sulfuric acid and ammonium persulfate treatment is reversible since there are no C—O bonds formed and rapid de-intercalation occurs. For instance, with water washing the intercalated $HSO_4^-$ and $H_2SO_4$ in the GICs rapidly de-intercalate, returning to graphite particles. On the other hand, the positive charges are generated in the graphene sheets during GIC formation and are balanced with intercalated $HSO_4^-$ ions. The distance between graphene sheets in the GIC is large enough for oxygen intercalation. Due to the high electronegativity of oxygen, a strong attractive interaction between oxygen and the positive charges on the graphene sheets exists, which facilitates oxygen intercalation and prevents its de-intercalation when the GIC is exposed to an aqueous environment.

In some embodiments, to keep the enlarged distance in the GICs, oxygen gas is purged through the freshly prepared GICs. The rate and/or the duration of the oxygen purge can be varied to optimize stabilization of the GIC against de-intercalation. In some embodiments, the GICs are oxygen-purged at the rate of 50-500 ml/min, preferably 50-200 ml/min and more preferably 90-120 ml/min. $O_2$ was purged for 1-2 hours, more preferably 1 hr, sufficient to stabilize the GICs against de-intercalation.

Microwave heating has been used for exfoliation of graphite intercalation compounds, graphite oxides and reduction of graphene oxide to graphene, and purification of carbon nanomaterials. It is recently applied to assist Ag nanoparticle catalyzed holey reduced graphene oxide fabrication. However, the present invention provides an approach for fabrication of holey graphene materials by microwave heating without involving any metal catalytic mechanism.

In the present invention, various microwave irradiation patterns are used to control the reactions happens concurrently or sequentially, which leads to fabrication of holey graphene materials with controlled structures. As examples, upon the first microwave irradiation pulse, either the dried OI-GIC or PO-GIC will be exfoliated (expanded). During this process, the existing defects in the GIC can be selectively being gasified, leading to direct generation of holes on the basal planes of the expanded graphene sheets. Alternatively, the first microwave irradiation pulse may be used to remedy the defects. By controlling the microwave irradiation power and time, the level of expansion and the level of defect fixing can be controlled. Then the second microwave irradiation pulse will be designed to generate holes on the basal planes of the expanded graphene sheets. Either way, for the first time, the holey graphene materials, which combine both features of nanoholes and their associated edges, and the exotic characteristics of pristine graphene (such as high electric and thermal conductivity, high chemical and thermal stability) can be fabricated. These kinds of holey graphene materials are herein referred as holey pristine graphene nanoplatelets to differentiate from the holey graphene materials in which various defects exist on the basal planes. The products are better described as graphene nanoplatelets because they usually contain more than one layers. The thickness and the lateral dimension of the holey pristine graphene nanoplatelets can be controlled.

Depending on the power and time applied in the second pulse, the hole can be enlarged, and the enlargement may accompany with the generation of baby holes and cutting graphene sheet to small pieces. Therefore the size of the holes, the distance of the holes, and hierarchical structures of the hole can be controlled. Also depending on the power and time applied, the hole enlargement may accompany with selectively evaporating carbon atoms from armchairs leaving the hole edge to be zigzag configuration dominated. This is the first approach geometrical structure of hole edges can be controlled to be rich in zigzag configuration by microwave irradiation. It is also the first mass-production approach to fabricate holey graphene materials with the geometrical structure of hole edges can be controlled to be rich in a zigzag configuration. The third or the four microwave irradiation pulse can be designed to fine tune the size of holes, distances of the holes, geometrical structure of hole edges, thickness and lateral dimension of the holey pristine graphene nanoplatelets.

The microwave response to carbon materials strongly depends on its structure, especially the size of the $\pi$-$\pi$ conjugated regions. For carbon materials with the size of the $\pi$-$\pi$ conjugated graphene domains that are large enough, there are mainly two heating mechanisms when microwave irradiation is performed in solventless conditions (or dry microwave irradiation): wireless joule heating (conduction heating) and micro-plasmas. The mechanism of microwave heating of carbon materials without solvent is mainly wireless (contactless) Joule heating. In this heating mechanism, the microwave does not directly heat conducting materials. Rather, the electromagnetic field of microwaves induces motion of electrons in conducting materials, which causes heating by electrical resistance. Therefore, the current induced during microwave irradiation is not converted to heat in perfect graphene domains due to their ballistic conduction behavior. On the other hand, the defective regions, in which oxygen-containing groups or other topological defects locate, will scatter the electrons and provide electrical resistance. Therefore, these defect regions will be selectively heated.

This regio selective heating can induce different chemical reactions depending on the microwave power, time, and the chemical nature of the carbon materials subjected to microwave irradiation, including (1) direct carbon combustion selectively at the defective regions to generate vacancies or nanoholes and therefore holey graphene materials are directly fabricated; and (2) deoxygenation and reconstruction of the defect $sp^3$ carbon bonds into the desired $sp^2$ configuration, resulting in largely increasing in the quality of carbon nanomaterials. Noted that Joule heating mechanism has been applied to fix the defects by controlling the right microwave irradiation power and time (lower than those used to directly knock out the atoms at the defect sites for direct perforation as stated above), especially if the irradiation is performed in an inert environment. It was also found that even in an oxidative environment, such as air, some of the defects could be fixed instead of direct perforation to generate holes.

Upon fixing the defects, the "perfect" graphene domains get larger on the graphene sheets. As a result, the thermal conductivity is increased. The local heat generated at the defects sites via Joule heating can be transport to the "perfect" graphene domains. If the temperature on the perfect graphene domains was high enough to overcome the energy barrier for oxidative carbon combustion, holes could be generated on these domains. After the fixed graphene domains are large enough, where delocalized $\pi$-electrons are free to move in much broader regions, continued microwave irradiation will automatically switch to another heating mechanism, i.e., microplasma. In this heating region, the kinetic energy of some electrons may increase high enough which enables them to jump out of the material, resulting in the ionization of the surrounding atmosphere. At a macroscopic level, this phenomenon is perceived as sparks or electric arcs formation. At a microscopic level, these hot spots are actually plasmas. The high temperature reached by these hot spots combined with the excellent thermal conductivity of the graphene sheets will change the heating from regioselective to a nonlocal regime. At this regime, microwave heating can also knock out some carbon atoms from the edge of the graphene sheets and also in the basal plane of the "perfect" graphene, generating vacancies and holes across the entire basal planes as long as they are accessible to an oxidant, such as molecular oxygen in the air. Since every atom on the basal plane has the same opportunity to be knocked out, the holes generated should be much uniformly distributed across the entire graphene sheets. Further, by changing the microwave irradiation environments, such as Ar, $N_2$, $O_2$, air, $H_2$, $H_2O$ (water vapor steam), and ratios of different gas mixtures, different types of plasma, and amount of plasma can be generated in this regime. By controlling the microwave irradiation power, period, and irradiation pattern, the size of the holes can be controlled, because edge atoms around the created holes have preferences to be knocked out. Therefore, longer irradiation would increase the sizes of the holes.

In fact, by carefully controlling the microwave power and time, it is possible to control the geometries of the hole edges to be zigzag dominated. The geometry control of the edges can be achieved through two synergistic mechanisms: wireless joule heating mechanism and plasma etching mechanism. As the generated holes may be a mixture of the armchair and zigzag geometries, further microwave treatment can be processed to adjust the ratio of these two kinds of edges. In the wired joule heating of graphene nanoribbons, the electronic flow is mainly along the zigzag edges due to their electronic states. Similarly, this concept also suits the process of wireless joule heating induced by microwave irradiation. The regioselective heating confines at the large resistance spots which are located at the junctions of the different edge intersections. If the energy dissipated is high enough at these junctions, the atomic structure will be rearranged into zigzag edges. Therefore, with careful control of the microwave energy, the armchair carbon atoms will be preferentially evaporated, leaving the zigzag edge as the prevailing kind of edge. Meanwhile, plasma is also playing a role in controlling the geometry of the edge. The plasma effect on the geometry of the edges varies with different kinds of plasma and the reaction conditions. Among all the plasma species, hydrogen is known as an effective etchant to produce zigzag edges. As discussed above, varying the gas environment can change the plasma type, thus can tune the geometry of the edges with the help of the plasma effect. Combining the joule heating effect and the plasma etching effect, the percentage of zigzag edges in the sample can be controlled in the range of 50 to 95%.

Therefore the approach provided in the present invention is intrinsically different from the previously reported scalable fabrication approaches. First of all, the starting materials for microwave irradiation are various graphite intercalation compounds (GICs) instead of GO/rGO. The first step is an expansion of GIC accompanied with either preferentially gasifying the existing defects to directly generating holes or the expansion accompanied with in-situ fixing and generating high-quality graphene-like materials so that each carbon atoms has equal opportunities to be knocked out in the following step. As a result, the holes generated will be uniformly distributed across the entire graphene sheets.

The extent of defects being fixed depends on the initial oxidation level of the starting graphitic materials and the microwave irradiation power and time applied. If the density of oxygen-containing functional groups, either locally or across the entire graphene sheets was high, during the heating process, other chemical processes also occur in parallel. As examples, the interplay between the oxygen-containing functional groups in GO/rGO leads to the formation of stable species such as in-plane ether or out-of-plane carbonyl groups, which are difficult to be removed even after high-temperature annealing in Ar (1100° C.). Furthermore, during high-temperature annealing, severe reconstruction via rearrangement of carbon atoms in the basal plane simultaneously occur, generating 5-8-membered rings and forming Stone-Walls types of defects in the basal planes. The current scalable methods to generate holey graphene materials always use highly oxidized carbon materials (such as GO/rGO) as starting materials, Therefore, the product unavoidably contains a large number of defects on their basal planes and possible metal residues, which not only decrease electrical and thermal conductivity, they also negatively influence the chemical and thermal stability of graphene materials for their long-term practical applications.

The formation of those hard-to-remove oxygen-containing species and structural reconstruction can be avoided if that starting GO has lower initial oxygen content. This is because isolated oxygen-containing groups can be easily removed at a lower temperature and recover to pristine graphene. So the second key feature of our approach is to start with cheap graphite particles, partially oxidize them before subjecting to microwave heating process. Various oxidation chemistries are chosen to fabricate partially oxidized graphite (POG), in which point defects uniformly distributed across entire graphene sheets of the graphite flakes. It is worthy to mention that $KMnO_4$ oxidation chemistry was intentionally not chosen even though it was the foundation of Hummer's method and widely used for GO production. This is because the $KMnO_4$ oxidation chemistry is hard to reach controlled partial oxidization across the entire graphite particle for the following reasons: The rate of diffusion of the oxidizing agent ($KMnO_4$) into the graphite interlayer galleries is lower than the rate of the chemical reaction itself. As soon as the oxidizing agent diffuses between the graphene layers, it quickly reacts with nearby carbon atoms. As a result, the oxidization was not spatially uniform. Some parts of the particles were over oxidized, while other parts were not oxidized at all. Furthermore, the present invention employs metal free and eco-friendly oxidation chemistries to solve the issues associated with using metal-containing compounds, such as metal residues in the products and toxic wastes.

The present invention provides a method to control the hole size and the lateral dimension of the holey graphene nanoplatelets by controlling microwave irradiation power, period, and irradiation pattern. For example, upon generation of the holes with the first microwave irradiation, the holes can be enlarged with another microwave irradiation. This is because the edge atoms around the holes will be gasified preferentially. The edge atoms are much more reactive, and the local temperature is much higher compared to the ones on the basal plane due to the regioselective mechanism of Joule heating. If the power is high enough or long enough, some baby holes in the basal plane can be generated accompanied with the enlargement of the previously generated holes. This will lead us to fabricate holey graphene nanoplatelets with hierarchical holey structures and with the controlled distance between the holes. This would be very important in energy storage application, in which ion diffusion is largely determined by the distance of the holes and sizes. This can be achieved due to the excellent thermal conductivity of the nearly "perfect" graphene domains. Even though the heat was regioselectively generated on the defect spots and edges, the excellent thermal conductivity can quickly transport the heat to the basal planes. If the temperature is high enough and these basal atoms are accessible to oxidant gas ($O_2$ here), gasification occurs on the "perfect" graphene domains, generating baby holes. With further extension of the period of microwave irradiation, the graphene sheets can be fractured to small ones with two possible molecular mechanisms, which would lead us to control the lateral dimensions of the holey graphene nanoplatelets. The first mechanism is possibly due to enlarging and merging of the generated holes, which eventually lead to fracture the graphene sheets to small ones. It is also possible that new oxidation reactions occur due to the generation of new functional groups such as epoxy groups on the basal planes or edges. These new reactions could lead to fracture of the graphene sheets to small ones via an unzipping mechanism.

In accordance with the present invention, the heating process is carried out by irradiating a sample of partially oxidized GICs, oxygen-purged GICs, or commercial expanded graphite with electromagnetic radiation in the microwave or radio frequency range. The frequency of the electromagnetic radiation used ranges from $10^8$ to $10^{11}$ Hertz (Hz). The input power is selected to provide the desired heating rate. In one embodiment, the preferred output power is up to about 10 kW. In some embodiments, the output power is between 5 W and 6000 W. In some embodiments, the output power is between 30 W and 2000 W. In some embodiments, the output power is between 100 W and 500 W.

The electromagnetic radiation may be pulsed or continuous. When using pulsed radiation, any arrangement of pulse duration and pulse repetition frequency which allows for the dissipation of adverse heat buildup may be used in the present invention. The pulse duration may be varied, from 2 to 100 seconds and the duration between pulses can vary from 5 seconds to 30 minutes with a designed cooling system or natural cooling with air. The sample may be irradiated for any period of time sufficient to oxide the graphite. These conditions can be readily determined by one of ordinary skill in the art without undue experimentation. The time required to achieve the result will be shorter for higher power settings.

When continuous radiation is utilized, the sample is heated for a time sufficient to exfoliate (expand) the GIC and drill holes or fix the defects in the expanded graphene sheets or platelets. Generally, the irradiation time is at least 3 seconds. Preferably, the irradiation time ranges from about 5 seconds to 5 minutes in order to achieve the desired extent of expansion, hole generation, and unzipping cutting. As with pulsed radiation, the time, power input, and the numbers of pulses can be routinely adjusted to achieve the desired result, which can be readily determined by one of ordinary skill in the art without undue experimentation.

Typically, continuous radiation is first employed to attain the desired reaction temperature, after which, pulsed radiation is employed to maintain the desired temperature. Accordingly, the duration of continuous radiation, pulse radiation duration, and radiation frequency can be readily adjusted by one having ordinary skill in the art to achieve the desired result based on simple calibration experiments. The extent of graphite oxidation may be confirmed, by conventional analytical techniques.

Irradiation of the sample may be conducted in any microwave and/or radio frequency heating device which is capable of continuous or pulsed radiation and has the power requirements necessary to thermally induce the conversion to graphene. Suitable heating devices include microwave ovens, waveguides, resonant cavities, and the like. Suitable heating devices are well known in the art, and are commercially available.

Typically, the process of the present invention is carried out by placing the sample inside a microwave or radio frequency device and applying the appropriate input power. The present invention may be applied as either a batch or continuous process. In one exemplary embodiment, the mixture is heated using microwave irradiation for around 5 seconds. In another exemplary embodiment, the mixture is heated using microwave irradiation for about 10 seconds. However, since microwave heating is volumetric heating, the irradiation time and/or power increases as the number of reactants increases, especially for the large-scale production. Thus, those of ordinary skill in the present art, one could readily adjust the power and duration to compensate for the increased amount of the reactant.

In some embodiments, the power, duration, and intervals of microwave irradiation pulses are carefully controlled to induce a Joule heating mechanism or a combination of a Joule heating mechanism and a micro-plasma heating mechanism.

In some embodiments, the fabricated holey graphene nanoplatelets have a mean hole size of vacancies of one to two atoms to about 500 nm.

In some embodiments, the fabricated holey graphene nanoplatelets have one layer to 500 layers of graphene sheets, or about 0.4 nm to about 200 nm in thickness. In some embodiments, the fabricated holey graphene nanoplatelets have about 200 nm to about 20 μm in thickness.

In some embodiments, the fabricated holey graphene nanoplatelets have a mean lateral dimension between about 0.5 μm and about 20 μm.

In some embodiments, the fabricated holey graphene nanoplatelets have a conductivity between about 7000 S/m and about 100,000 S/m, and a C:O ratio between 15:1 and 55:1.

In some embodiments, the pristine nature of the fabricated holey graphene nanoplatelets were described by the following parameters: (1) conductivity in the range of 10,000-70,000 S/m; (2) C:O ratio in between 10-54; (3) the $sp^2$ carbon range is from 65-95%; and (4) $I_D/I_G$ band intensity ratio in Raman spectroscopy 0.030-0.6.

The examples set forth below also serve to further define the disclosed invention but are not meant in any way to restrict the scope of the invention.

EXAMPLES

Example 1

A reversible graphite intercalation compound (GIC) was achieved by following the recipe process described by Tours group. In brief, 1000 mg of Ammonium persulfate (reagent grade 98%, Sigma Aldrich) was dissolved in 10 ml $H_2SO_4$ (98% Pharmaco Aaper). The solution mixture was stirred for 5-10 mins to dissolve the salt and form a uniform suspension. To this solution mixture, 200 mg of Graphite flakes was added (size>500 μm). The reaction mixture was stirred for 6 hrs to form the reversible Intercalated Graphite (GIC, mainly stage 1). $O_2$ was purged into GIC solution at the rate of 90-120 ml/min for a period of 1 hour. Heating this solution at 80° C. for 1 hr leads to partial oxidation of the intercalated graphite compounds. This reaction mixture is quenched in 200 ml water and then washed via vacuum filtration through a polycarbonate membrane with a pore size of 0.8 μm with 200 ml water each for four times. The product is dried in the vacuum oven for 2-3 days. The resulting sample is hereby referred to as partially oxidized GIC (PO-GIC). These details also see Scheme 2.

Figure 1:
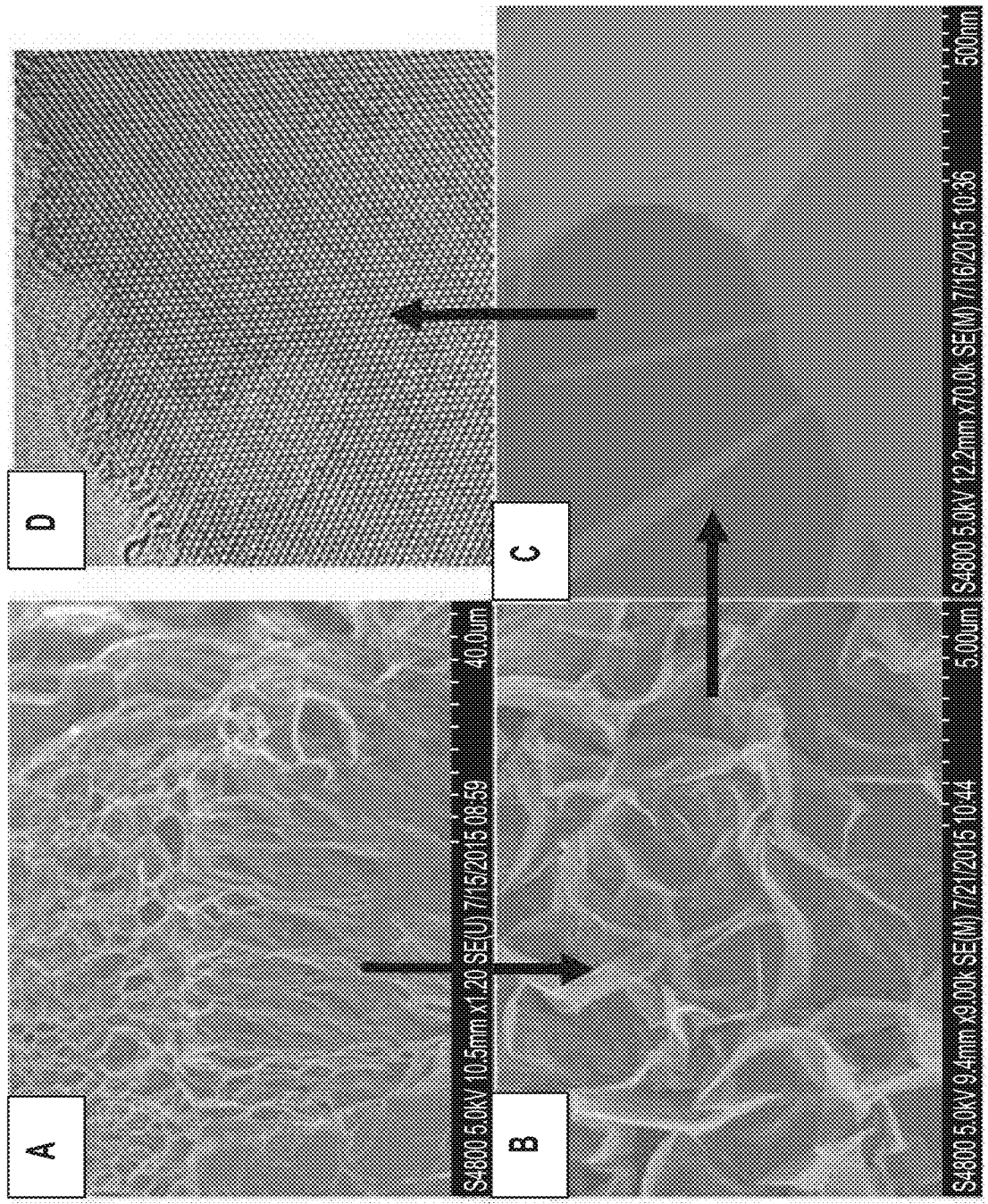
FIG. 1 shows SEM pictures of the exfoliated (expanded) graphene from partially oxidized graphite intercalation compounds (PO-GIC) (FIGS. 1A, 1B, and 1C) with different magnification (named PO-GIC-Exp).

50-60 mg of (PO-GIC) was subjected to microwave irradiation pulse at 300 W/5 sec leads to efficient expansion of the GIC, which is named as POG-exp. SEM and high-resolution TEM clearly demonstrated that the PO-GIC was efficiently expanded. Majority of the defects were fixed and the graphene sheets have the sp$^2$ carbon structures on the basal planes. The edges are more etched due to their high reactivity (FIG. 1).

Figure 2:
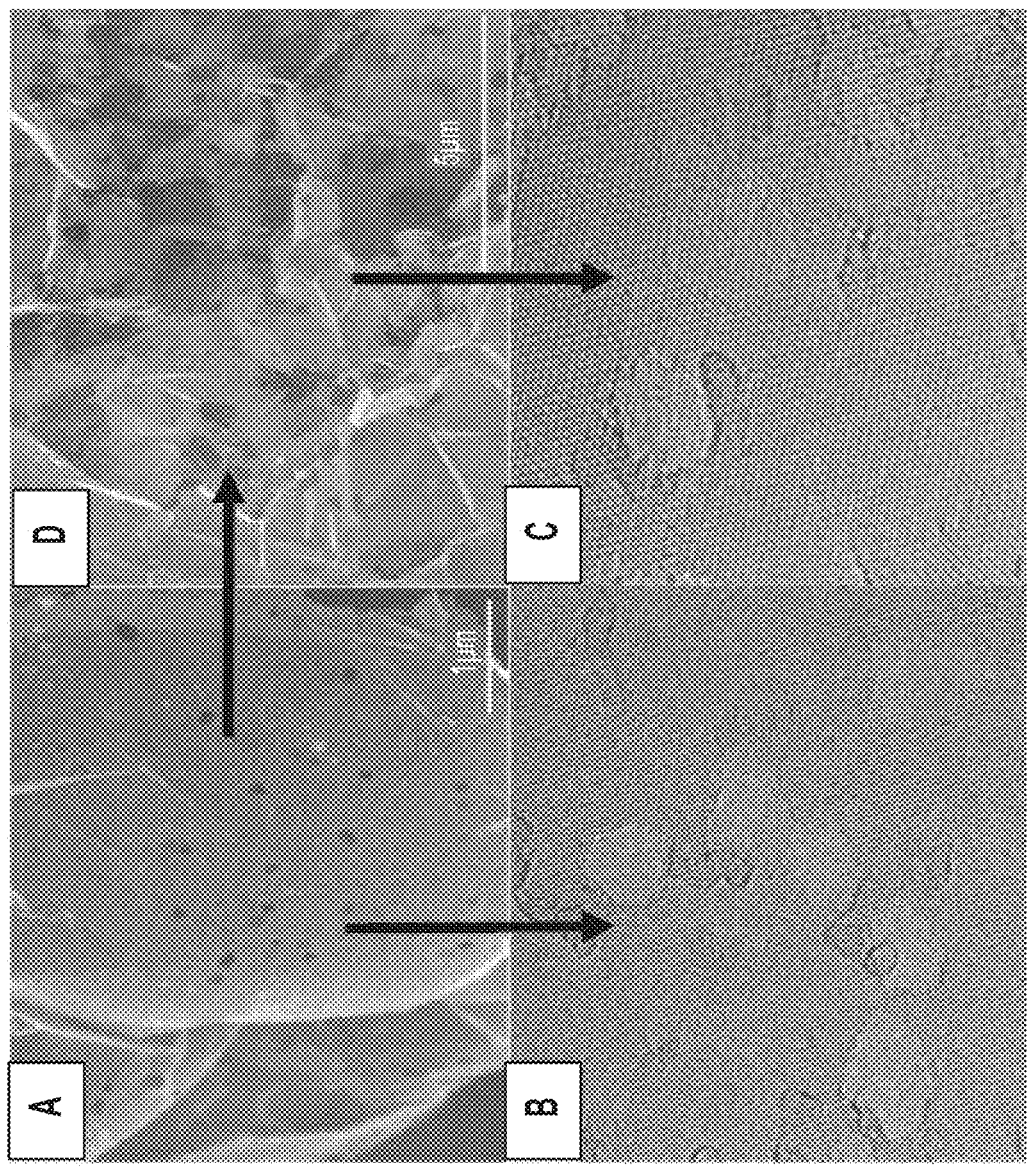
FIG. 2A shows an SEM picture of the pristine holey graphene nanoplatelets fabricated from PO-GIC-Exp with another 5 seconds of 200 W irradiation (named as PO-GIC-H)
FIG. 2B is an SEM picture upon two 5-seconds 200 W irradiation (named as PO-GIC-HE).
FIGS. 2C and 2D shows two representative atomic resolution TEM pictures of these two samples, locating on the spots where large holes cannot be seen by SEM due to its low lateral resolution, indicating baby holes can be generated during enlarging the previously formed holes. It is remarkable that even small holes existed in these samples, the basal planes still largely retain the pristine $sp^2$ graphene structures.

Microwave irradiation of PO-GIC with two microwave irradiation pulses at 200 W/5 seconds leads to an expansion in combination with the generation of holes, enlargement of the holes and generation of baby holes. This product is termed as PO-GIC-H (FIGS. 2A and 2C). The 3 pulses at 200 W/5 seconds leads to an expansion in combination with the generation of holes, enlargement of the holes, generating baby holes and cutting of the graphene sheets. The edges of the holes and sheets become irregular (FIGS. 2B and 2D). This product is termed as PO-GIC-HE. Between pulses, the sample was cooled to room temperature before each pulse starts.

Example 2

A PO-GIC was fabricated with a mixture of $H_2SO_4$ and $H_2O_2$ (Scheme 3). In this oxidative intercalation chemistry, graphite intercalation and partial oxidation were achieved in one-step, which largely simplifies the fabrication process, but still keeps metal-free and eco-friendly characteristic of the fabrication process. In Brief, 100 mg of Graphite flakes were added (size>500 μm) to 10 ml of piranha solution (15:1 volume ratio of $H_2SO_4$ (98%, Pharmaco Aaper) and $H_2O_2$ (30% w/w from BDH)) for a period of 1 hr. The resulting solution is quenched in 200 ml water and then washed via vacuum filtration through a polycarbonate membrane with a pore size of 0.8 μm with 200 ml water each for four times. The product was dried in the vacuum oven for 2-3 days.

Microwave irradiation of this PO-GIC with one microwave irradiation pulse at 300 W for 10 seconds leads to an expansion in combination with the generation of holes (FIGS. 3A and 3B).

Example 3

A reversible graphite intercalation compound (GIC) was achieved by following the recipe process described by Tours group. In brief, 1000 mg of Ammonium persulfate (reagent grade 98%, Sigma Aldrich) was dissolved in 10 ml $H_2SO_4$ (98%, Pharmaco Aaper). The solution mixture was stirred for 5-10 mins to dissolve the salt and form a uniform suspension. To this solution mixture, 200 mg of Graphite flakes was added (size>500 μm). The reaction mixture was stirred for 6 hrs to form the reversible Intercalated Graphite (GIC, mainly stage 1). $O_2$ was purged into the GIC solution at the rate of 90-120 ml/min for a period of 1 hr. The resulting solution was not heated up for partial oxidation, is quenched directly in 200 ml water and then washed via vacuum filtration through a polycarbonate membrane with a pore size of 0.8 μm with 200 ml water each for four times. The product was dried in the vacuum oven for 2-3 days. The resulting sample is hereby referred to as oxygen intercalated GIC (OI-GIC) (Scheme 4).

In one embodiment, ≈50-60 mg of OI-GIC was subjected to microwave irradiation with three pulses. The two pulses are 200 W/5 sec for expansion and generation of holes. The third pulse is 50 W/5 seconds. The majority of the holes are hexagonal shaped (FIG. 4A). Compared to the circular shaped holes, the geometrical structure of the edges in the hexagonal shaped holes is dominated as zigzag. Where a mixture of zigzag and armchair will show as a circular shaped hole (FIG. 4B).

Example 4

Figure 5:
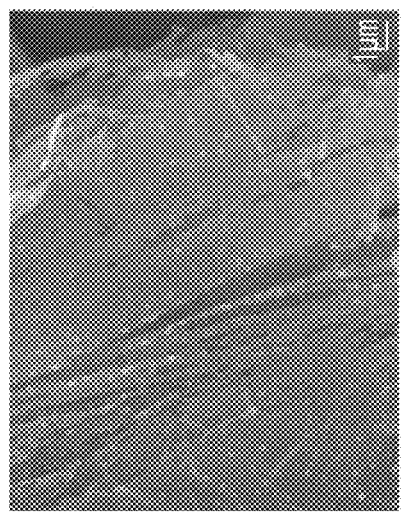
FIG. 5 shows an SEM picture holey graphene nanoplatelets fabricated from commercial expandable graphite (CEG). During pulse microwave irradiation, expansion of the expandable graphite accompanied with scissoring of the graphene sheets to ribbons like structures.

50 mg of commercial expandable graphite (CEG, from Asbury Graphite Mills, Inc) was directly subjected to microwave irradiation. Expansion accompanied with scissoring of the graphene sheets to ribbons like structures (FIG. 5) with two microwave pulses of 200 W/5 seconds (10 seconds in total). Between pulses, the sample was cooled to room temperature before the second pulse starts.

CHARACTERIZATION AND APPLICATIONS

Figure 6:
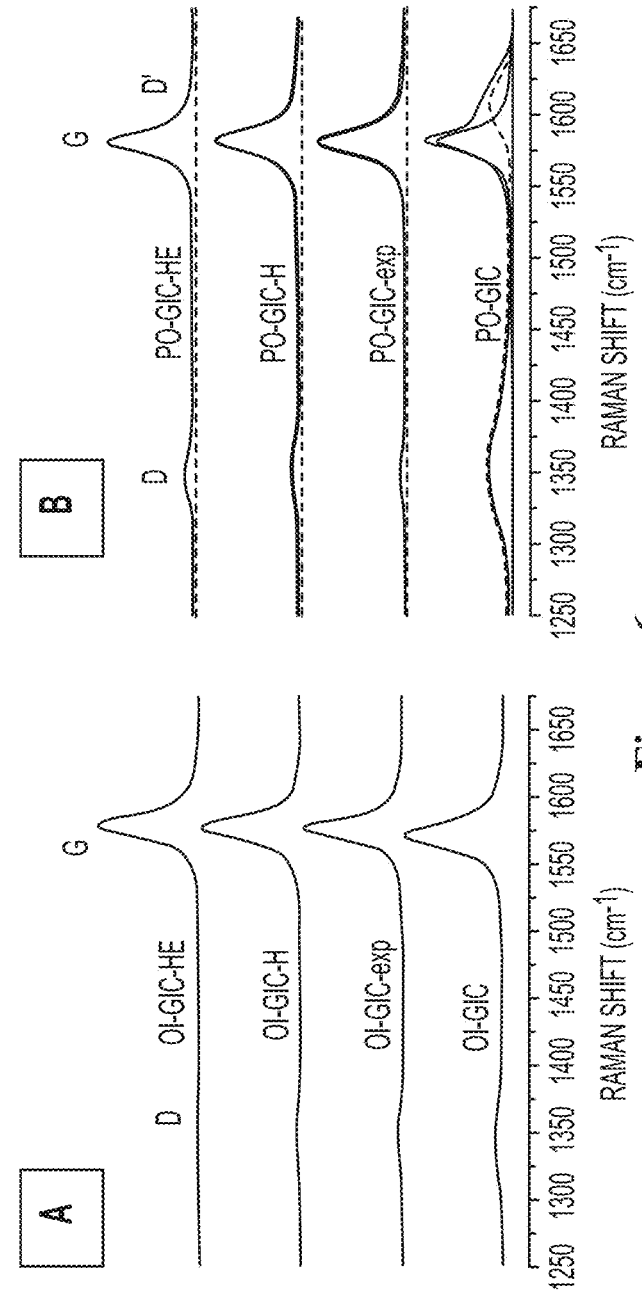
FIG. 6A shows Raman spectra of holey graphene nanoplates from the OI-GIC series and FIG. 6B shows Raman spectra of holey graphene nanoplates from the PO-GIC series.

Degree of Crystallinity and Pristine Nature of the Graphene Nanoplatelets Evaluated by $I_D/I_G$ in Raman Spectroscopy The high degree of crystallinity of these edge holey graphene was studied by Raman spectra, which indicated the presence of D band (breathing modes of the sp$^2$ carbon in the ring activated by defects can be either on the basal plane or edges) and a prominent G band (bond stretching of sp$^2$ carbons in ring) in all the holey graphene nanoplatelet materials. FIG. 6 shows the Raman spectra of the products described in example 1 and 3. The lowest $I_D/I_G$ was recorded to be in the range of 0.040-0.28 in OI-GIC-HE/POG-HE. These low $I_D/I_G$ ratios are similar to the pristine graphene fabricated by chemical vapor deposition, are significantly lower than the reported holey graphene materials synthesized by the air oxidation of rGO ($I_D/I_G>1$). A doublet in the 2D region was observed by Lorentzian fit indicating that the as-synthesized holey graphene is few layered.

Pristine Nature of the Graphene Nanoplatelets by Sp$^2$ Carbon and C/O Ratio Measured by X-Ray Photoelectron Spectroscopy (XPS)

Figure 7:
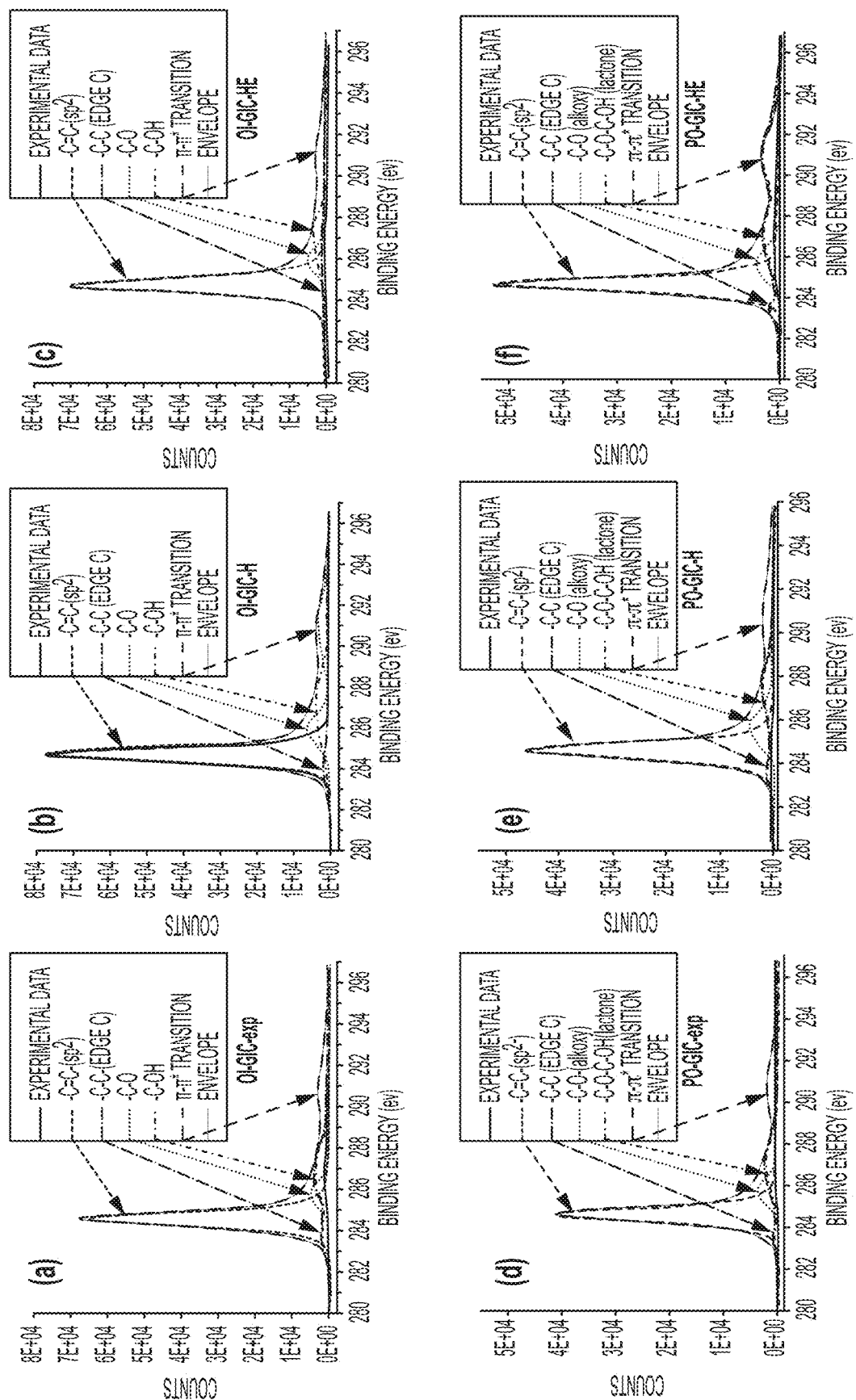
FIGS. 7A, 7B, and 7C show XPS C1s spectra of the holey graphene nanoplates from the OI-GIC series.
FIGS. 7D, 7E, and 7F show XPS C1s spectra of the holey graphene nanoplates from the PO-GIC series.

XPS spectra were collected to study the total carbon and oxygen content, the ratio of C/O and the percentage of sp$^2$ carbon (FIG. 7). The C/O ratio and the percentage of sp$^2$ carbon existing in the samples were used as another indicator of the pristine nature of the holey graphene nanoplatelets. The deconvolution of the C peak exhibits a strong, sharp peak at 284 eV along with 291 eV, where the former is attributed to the C=C in the graphene lattice and the latter is attributed to the π-π* transition peak indicating the preservation of delocalized π conjugation. The presence of peaks at 286 eV and 287 eV are contributed to the C—O (532 ev for O) and C=O (533 ev for O) in both the IO-GIC and PO-GIC series. The PO-GIC-HE reports 96.37% of C and 3.63% of O which is slightly higher than the OI-GIC-HE (97.05% of C and 2.95% of O). The C/O ratio ranges from 18.81-52.88 depending on the starting materials for microwave irradiation, and the microwave irradiation patterns were applied during the microwave assisted expansion and percolation processes.

Conductivity

One of the important properties of these holey edge structures is not only to generate more catalytic centers but also to preserve the graphitic crystalline domains to improve their electron transport. Hence the conductivity measurements were conducted on the PO-GIC-HE films by four-point probe method. The measurements were carried out by assembling a film via vacuum filtration of the dispersed PO-GIC-HE by sonicating in a mixture of ethanol and water (3:1 v/v) and without separating the single- and few-layer holey graphene. The superior crystalline structure of the OI-GIC-HE also recorded a high conductivity of 35,195 S/m when compared to the PO-GIC-HE (17,514 S/m), further supporting the crystalline nature of the as-synthesized holey graphene.

Control Zigzag Edges (EPR Studies, SEM)

Figure 8:
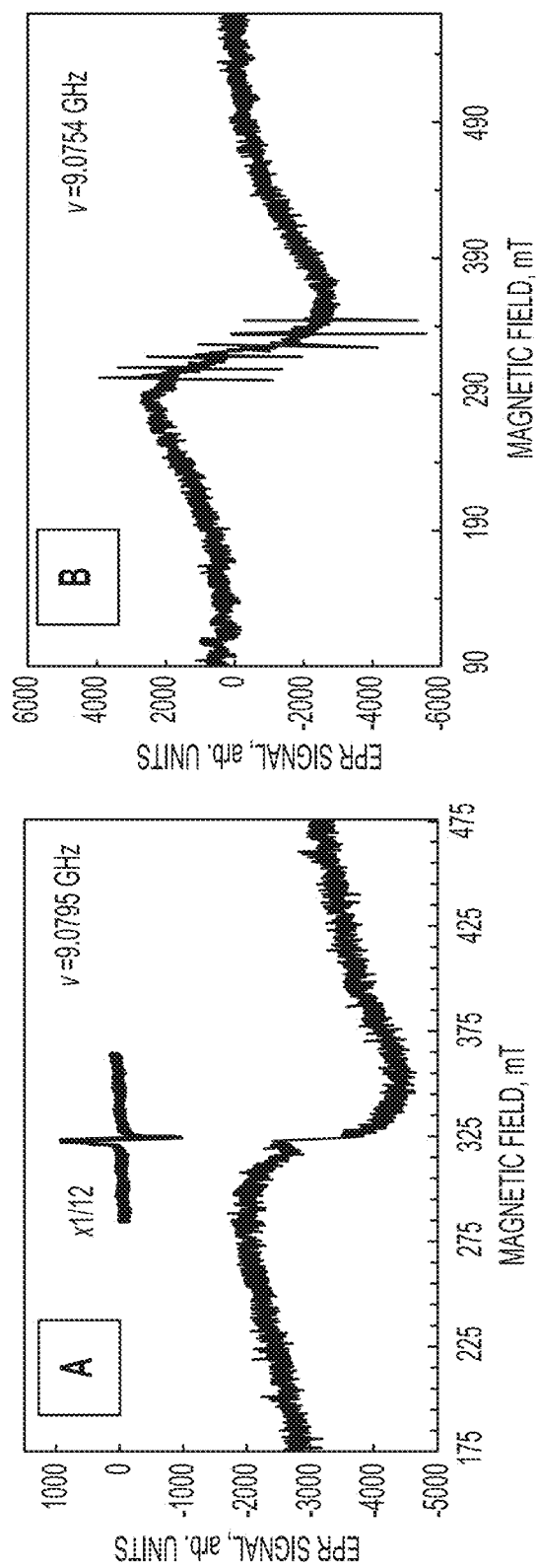
FIGS. 8A and 8B (collectively "FIG. 8") show room temperature EPR spectra of holey graphene nanoplatelets from the PO-GIC series.

The presence of abnormally broad EPR line permits us to measure edge-localized π-electronic spin states (S=½), which happened both on the periphery and interior perimeters of holes in the holey graphene nanoplatelets (FIG. 8).

The concentration of paramagnetic species S=½ responsible for broad EPR signal in PO-GIC-H and PO-GIC-HE samples is at least several times more than that one in precursor sample of partially oxidized graphite original (PO-GIC) and exceeds ~5×10$^{20}$ g$^{-1}$. Such concentration of paramagnetic species corresponds to ~10000 ppm or in other words ~1 species per 100 carbon atoms. Indeed, π-electronic edge spins may present there in such high concentration and at the same time be the only paramagnetic agents coupled by strong magnetic interaction mediated by itinerant π-electrons of holey graphene nanoplatelets.

Chemical Catalytic Performance

Figure 9:
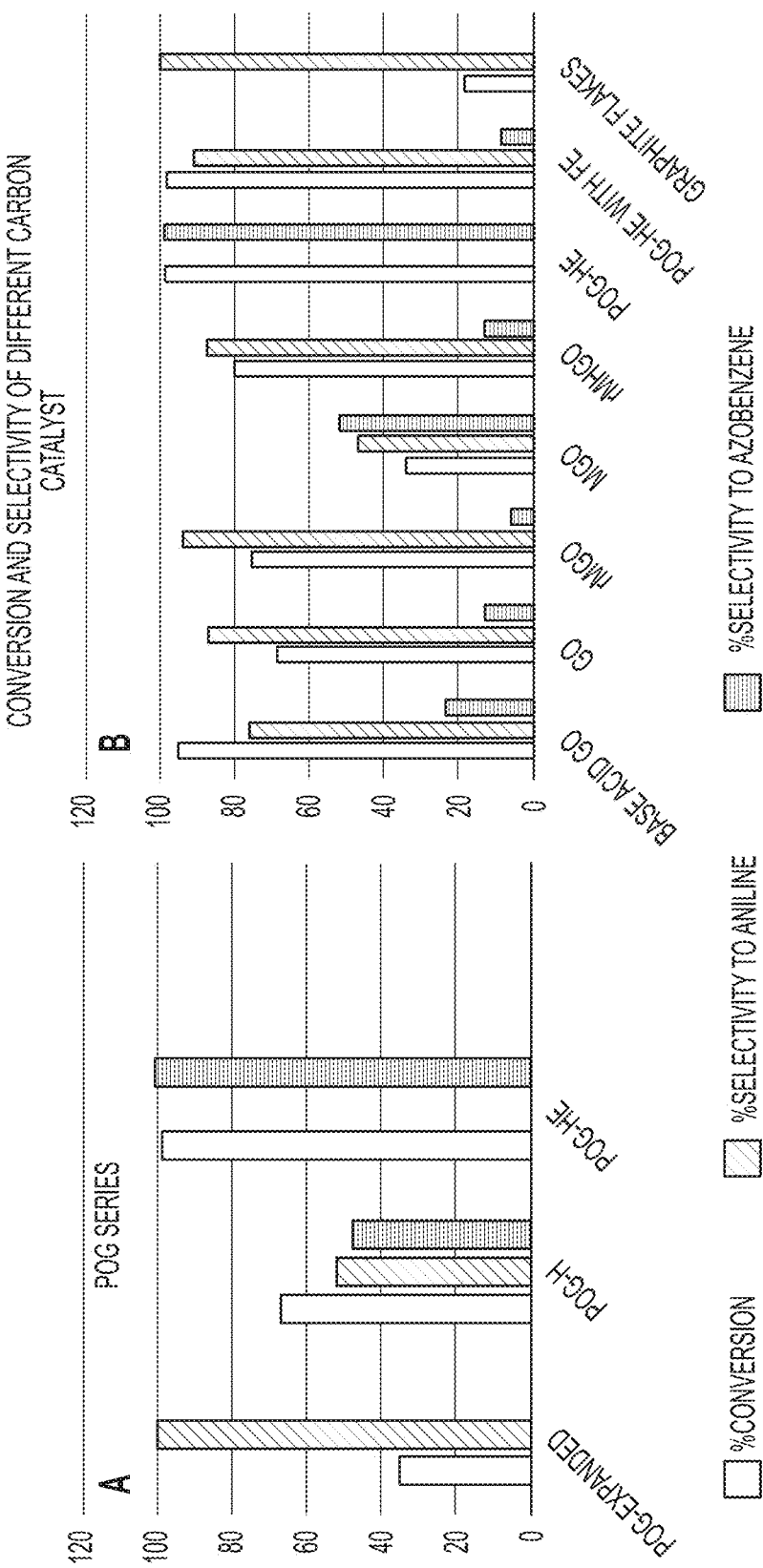
FIG. 9A shows the catalytic performance of the holey graphene nanoplatelets with an increased amount of edges.
FIG. 9B shows the comparison with other holey graphene materials fabricated with GO as starting materials.

Activation of hydrogenation for reduction of nitrobenzene to Aniline/Azobenzene is an important reaction in chemical industries. The nitrobenzene reduction to azobenzene with 100% selectivity accompanied by 99% conversion was achieved with the PO-GIC-HE in the presence of nominal H$_2$ pressure of 4 atm along with liquid proton donor, isopropanol. The conversion decreased with decreased defect density along with their selectivity towards aniline and azobenzene. A 100% selectivity to aniline was achieved with the same catalyst loading with PO-GIC-exp, whereas ≈1:1 selectivity to aniline and azobenzene was reported for PO-GIC-H (FIG. 9A). In order to test the catalytic active center, several carbon catalysts were tested for its nitrobenzene reduction, with the same catalyst loading. The presence of ≈1 wt % Iron in the PO-GIC-HE has altered the selectivity to 100% aniline with 99% conversion, indirectly proving the catalytic activity due to the holey graphene rather than the metal impurities (FIG. 9B). The reduction reactions are carried with various graphene catalysts to study the reduction of nitrobenzene with the same catalyst loading and their catalytic activity. A conversion of 75% was reported for the rMGO whereas generation of holes increased to 80% in rMGO (rMHGO). The conversion greatly decreased with the MGO catalyst proving that the reduction reaction can be facilitated in the presence of the high quality sp$^2$ basal plane which facilitates the transport of electrons. The activity in MGO can be recorded as the initial reduction to rMGO, and this is supposed to reduce the nitrobenzene. The presence of spin in the base-acid treated GO, improved the conversion to 95% with 75% selectivity to aniline, indicating the importance of spin with the high-quality sp$^2$ basal plane for achieving the high conversion with high selectivity observed in the case of PO-GIC-HE.

Chemical Stability and Reusability of the Catalysts

Figure 10:
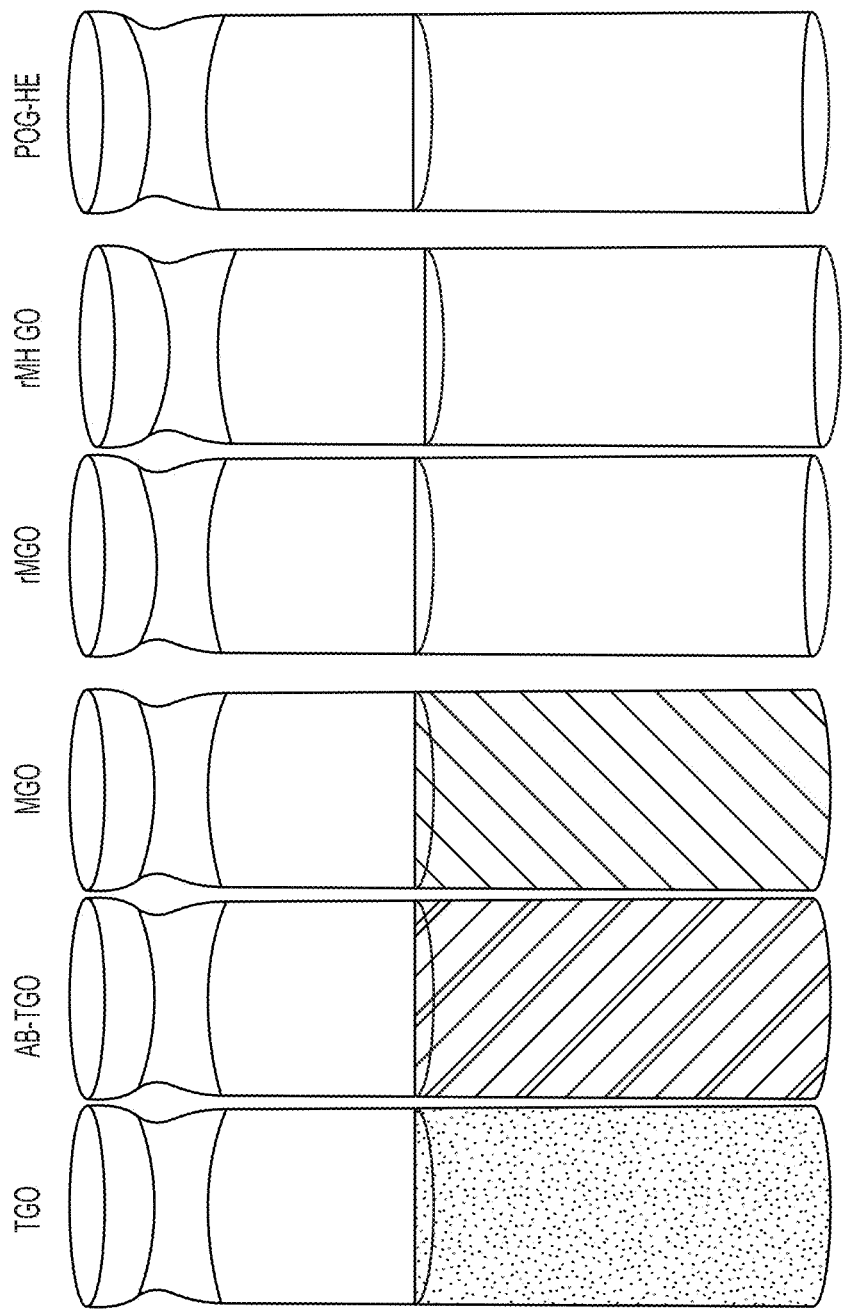
FIG. 10 shows a photograph of the filtrate obtained during cleaning of various holey graphene materials after the catalytic reactions. These holey graphene materials were used as metal-free catalysts. The color of the solution was used to directly demonstrate the chemical stability of the catalysts against chemical degradation. The darker color of the solutions meaning more degradation of the catalysts during the catalytic reaction.

After the catalytic reactions, the catalysts were separated from the product via simple filtration. The catalysts were washed and collected for reusability studies. The washed solutions show brown color, indicating that the catalysts were decomposed to nanosheets. While all the catalysts fabricated using GO as starting materials degraded to a certain degree, the PO-GIC-HE solution still crystal clear, suggesting its excellent chemical stability (FIG. 10).

Electrochemical Catalytic Performance

Figure 11:
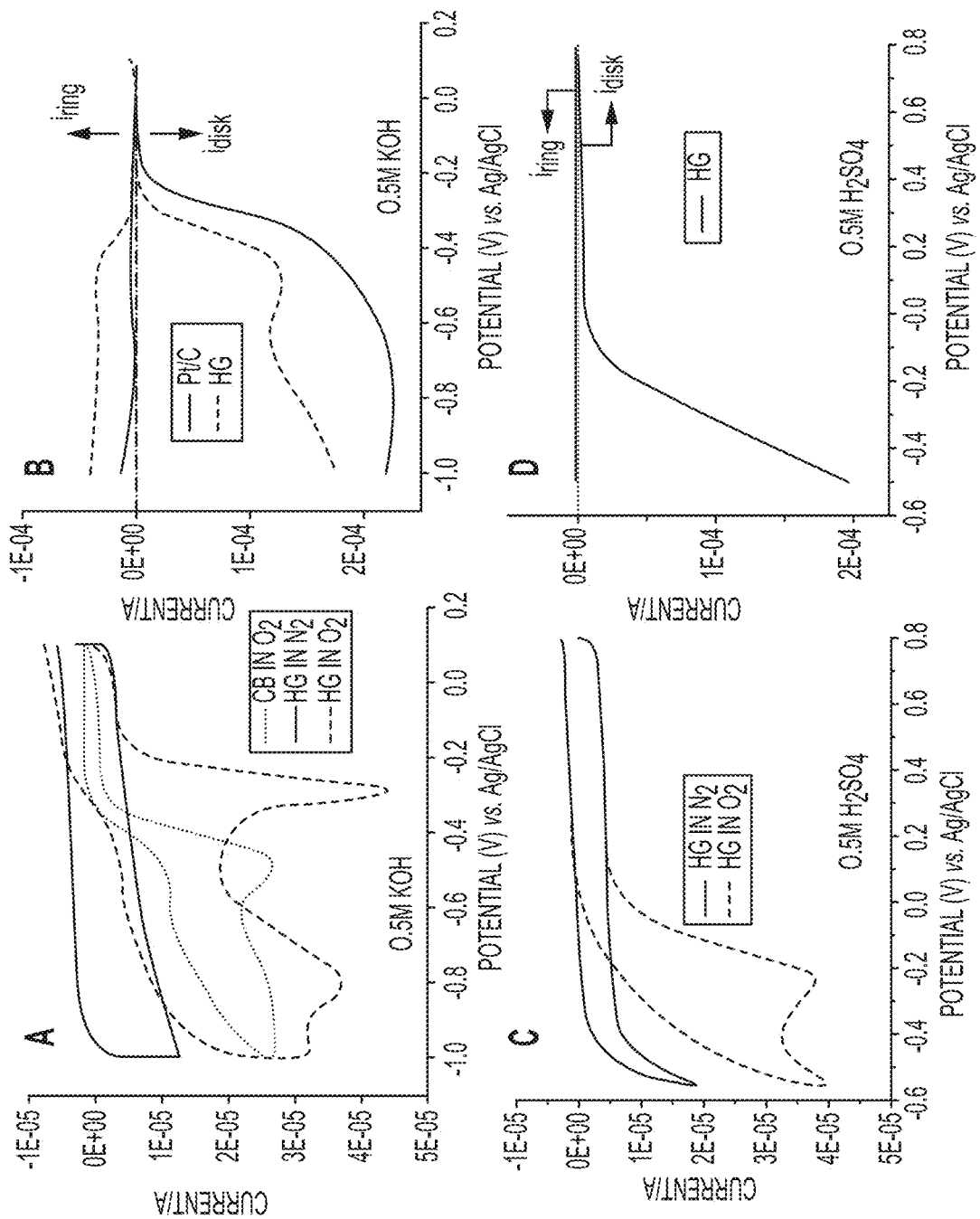
FIGS. 11A, 11B, 11C, and 11D (collectively "FIG. 11") show electrochemical catalytic performance.

The catalytic activity of the OI-GIC-HE and PO-GIC-HE in the molecular O$_2$ activation was studied in ORR. The OI-GIC-HE exhibited an oxygen reduction in both 0.5 M H$_2$SO$_4$ and 0.5 M KOH, with a single reduction peak in the former case and two reduction peaks in the latter case (FIG. 11). The Oxygen reduction can occur via the four-electron pathway, where O$_2$ is directly reduced to water or the two-electron pathway where O$_2$ is reduced to peroxide and consequently to water. This two-electron process is detrimental to fuel cells as the peroxide leads to corrosion of the cell components, eventually leading to the decrease in the fuel cell efficiency. However, generation of peroxide in situ is beneficial for its use as an oxidant, bleaching agent, degradation of the toxic waste, etc. Hence the quantification of the % peroxide and the electron transfer number were calculated by recording the LSV using Rotating Ring Disk electrode (RRDE). The % HO$_2^-$ and the electron transfer number (n) was measured according to the equation listed as $$\% \ HO_2^- = \frac{200 \times \frac{I_r}{N}}{I_d \times \frac{I_r}{N}} \quad (1)$$

$$n = \frac{4 \times I_d}{I_d + \frac{I_r}{N}} \quad (2)$$

I$_d$ and I$_r$ is the disk and ring current, whereas the N is referred to as current collection efficiency of the Pt ring electrode. In basic electrolyte medium, 0.5M KOH, the reverse phenomenon was observed, i.e., highest % HO$_2^-$ generation was recorded and was quantified as 90-95% with an electron transfer number of 2.21 to 2.12 at −0.5V was observed (FIGS. 11A and 11B). The stability of the holey graphene was recorded as current vs. time. The current decreased to 80% over a period of 8 hrs whereas it decreased to 20% in Pt/C (FIG. 7F). While in acidic conditions (0.5 H$_2$SO$_4$), the LSV of OI-GIC-HE exhibited lowest % HO$_2^-$ generation which was quantified as 4.9% with an electron transfer number of 3.90 at 0.05V (FIGS. 11C and 11D), which is close to Pt/C based catalysts, demonstrating its potential uses to replace the expensive Pt/C for fuel cell applications.

Battery Applications

Figure 12:
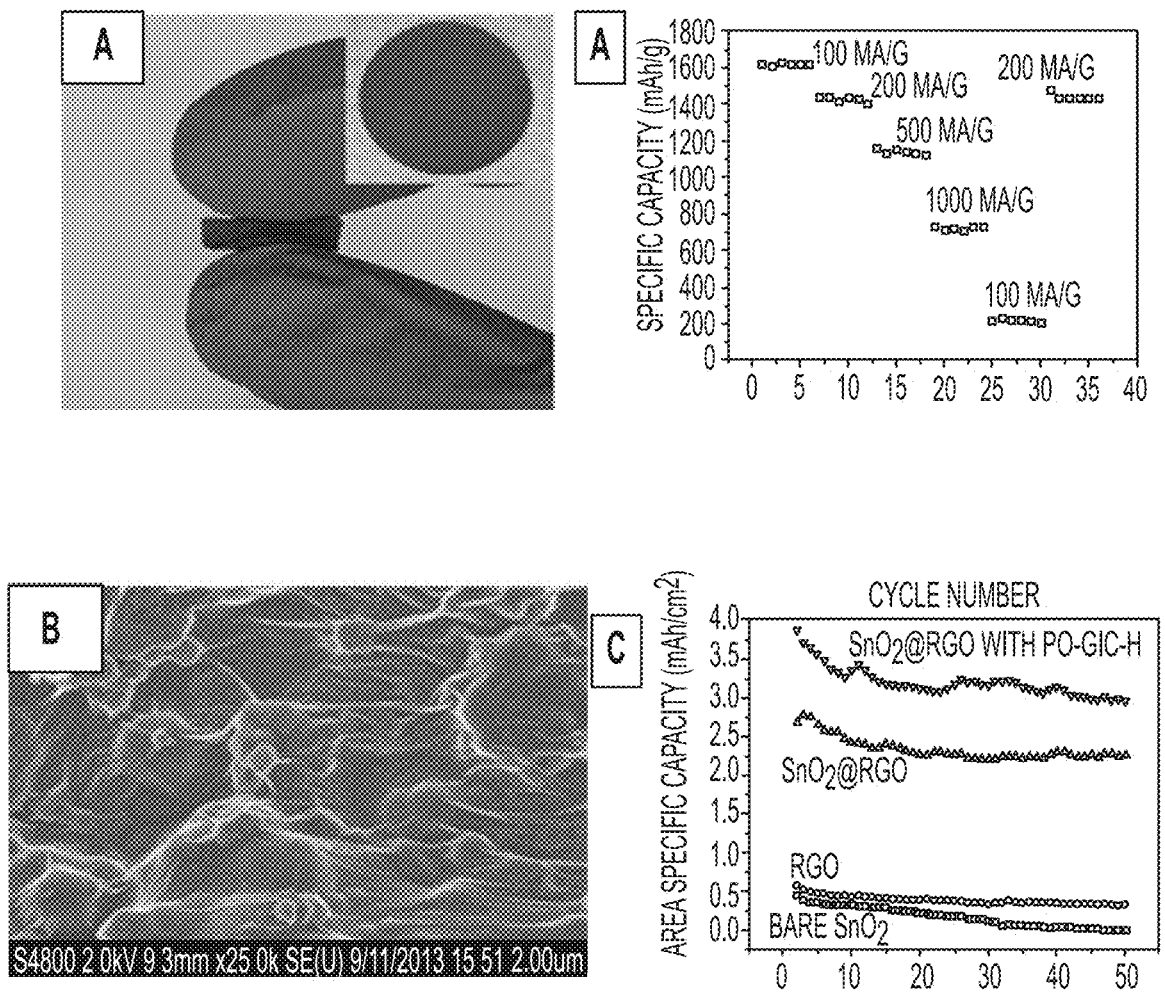
FIG. 12A shows pictures of free-standing $SnO_2$@RGO composite anode after thermal annealing.
FIG. 12B shows SEM picture of the $SnO_2$@RGO composite.
FIG. 12C shows rate performance of free-standing $SnO_2$@RGO composite anode.
FIG. 12D shows Cycling performance (area specific capacity) of bare $SnO_2$, bare RGO, $SnO_2$@RGO composite anode and $SnO_2$@RGO with PO-GIC-H composite anode at the current density of 500 mA/g.

Currently, nanomaterials-based batteries show great potential to improve the current Li-ion battery technology. However, it is still hindered by the low electric and especially low Li ionic conductivity when higher loading of electroactive battery materials was applied. This is a critical factor to be solved for practical applications. The high conductivity (both electric and ionic) of the pristine holey graphene materials offered may solve this issues. This example is provided to demonstrate the feasibility. Recently we developed anti-solvent precipitation method to fabricate SnO$_2$@graphene oxide composite. Thermal annealing at 500° C. was applied to reduce the GO and recover the conductivity of graphene. The obtained SnO$_2$@RGO composite is free-standing and flexible without the use of a carbon black, polymer binder and even current collector (FIG. 12), can be directly used as an anode electrode for LIB. The SnO$_2$@RGO composite anode exhibit reversible capacity of 1600, 1400, 1100, 700, and 200 mAh/g at the current density of 100, 200, 500, 1000, and 2000 mA/g, respectively. The specific capacity was recovered to 1400 mAh/g when the current density was reduced from 2000 to 100 mA/g, calculated by the total mass of the composite electrode (FIG. 12). The high capacity and the high rate performance are possible due to the unique structure of the composites, in which the SnO$_2$ nanoparticles were wrapped homogeneously and loosely with RGO 3D network. Such a special nanostructure facilitated electron migration throughout the secondary particles, while the presence of abundant voids between the SnO$_2$ nanoparticles and RGO sheets was beneficial for Li+ diffusion. The area capacity of the present SnO$_2$@RGO composite anode is one of the highest among the different SnO$_2$ anode at the current density of 500 mA/g (FIG. 12). Remarkably, when a small amount (total weight 5%) of our highly conductive holey graphene nanoplatelets (PO-GIC-H) was added during the electrode fabrication, much increased specific capacity was observed. Most importantly, the area-specific capacity energy density dramatically increased from 2.2 to 3.2 mAh/g, an improvement of 31% (FIG. 12). The much-improved area specific density possibly results from both of the high electronic conductivity and Lithium-ion conductivity of the pristine holey graphene nanoplatelets.

The use of the word "a" or "an", when used in conjunction with the term "comprising" in the claims and/or the specification, may mean "one," but it is also consistent with the meaning of "one or more," "at least one," and "one or more than one."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "about" generally refers to plus or minus 0-10% of the indicated number. For example, "about 20" may indicate a range of 18 to 22, and "about 1" may mean from 0.9-1.1. Other meanings of "about" may be apparent from the context, such as rounding off, so, for example, "about 1" may also mean from 0.5 to 1.4.

Other objects, features, and advantages of the present invention will become apparent from the following detailed description. It should be understood, however, that the detailed description and the examples, while indicating specific embodiments of the invention, are given by way of illustration only. Additionally, it is contemplated that changes and modifications within the spirit and scope of the invention will become apparent to those skilled in the art from this detailed description.

We claim:

1. A method for fabricating holey graphene nanoplatelets, the method comprising:
subjecting partially oxidized graphite intercalation compounds (PO-GICs), oxygen intercalated graphite intercalation compounds (OI-GICs), or commercial expandable graphite (CEG) to one or more microwave irradiation treatments to obtain holey graphene nanoplatelets,
wherein the holey graphene nanoplatelets comprise one or more expanded graphene sheets having a plurality of holes on the basal planes thereof, and
wherein the microwave irradiation treatments further comprise: a first microwave irradiation to remedy existing defects on the basal planes of the expanded graphene sheets; a second microwave irradiation to generate baby holes on the basal planes of the expanded graphene sheets; and a third microwave irradiation to obtain the plurality of holes by fine-tuning the generated baby holes, such that the expanded graphene sheets of the holey graphene nanoplatelets have a predetermined number of holes of predetermined size and geometry on the basal planes of the expanded graphene sheets.

2. The method of claim 1, wherein the partially oxidized graphite intercalation compounds (PO-GICs) are prepared by:
adding graphite flakes to a mixture of ammonium persulfate and sulfuric acid to form a reversible graphite intercalation compound;
purging the mixture containing the reversible graphite intercalation compound with oxygen gas; and
heating the mixture to obtain the partially oxidized graphite intercalation compounds (PO-GICs).

3. The method of claim 1, wherein the partially oxidized graphite intercalation compounds (PO-GICs) are prepared by:
exposing graphite flakes to a mixture of hydrogen peroxide and sulfuric acid.

4. The method of claim 1, wherein the oxygen intercalated graphite intercalation compounds (OI-GICs) are prepared by:
adding graphite flakes to a mixture of ammonium persulfate and sulfuric acid to form a reversible graphite intercalation compound; and
purging the mixture containing the reversible graphite intercalation compound with oxygen gas.

5. The method of claim 1, wherein the oxygen intercalated graphite intercalation compounds (OI-GICs) are oxygen intercalated few layer graphene (OIG).

6. The method of claim 5, wherein the oxygen intercalated few layer graphene (OIG) is prepared by:
adding few layer graphene platelets to a mixture of ammonium persulfate and sulfuric acid to form a reversible graphite intercalation compound; and
purging the mixture containing the reversible graphite intercalation compound with oxygen gas.

7. The method of claim 2, wherein the step of purging the mixture comprises purging the mixture containing the reversible graphite intercalation compound with oxygen gas at a rate of between about 90 ml/min and about 120 ml/min for a period of between about 30 minutes and about 120 minutes.

8. The method of claim 1, wherein one or more parameters of the microwave irradiation treatments are selected to induce a Joule heating mechanism or a combination of a Joule heating mechanism and a micro-plasma etching mechanism to obtain a predetermined number of holes of predetermined size and geometry on the basal planes of the expanded graphene sheets, one or more parameters comprising duration, power, and intervals of microwave irradiation pulses.

9. The method of claim 1, wherein the microwave irradiation treatments comprise one or more microwave irradiation pulses at the power of between about 10 Watt and about 300 Watt for a period of about 3 seconds and about 150 seconds.

10. The method of claim 1, wherein said plurality of holes have a geometrical structure of hole edges predominantly in a zigzag configuration.

11. The method of claim 1, wherein said plurality of holes are uniformly distributed across the basal planes of the expanded graphene sheets.

12. The method of claim 1, wherein the mean hole size of said plurality of holes is about 5 nm to about 500 nm.

13. The method of claim 1, wherein the mean thickness of the holey graphene nanoplatelets is from about 0.4 nm to about 14 nm.

14. The method of claim 1, wherein the mean lateral dimension of the holey graphene nanoplatelets is from about 0.5 μm to about 20 μm.

15. The method of claim 1, wherein the holey graphene nanoplatelets have a conductivity between about 7000 S/m and about 100,000 S/m.

16. The method of claim 1, wherein the holey graphene nanoplatelets have a C:O molar ratio between 15:1 and 55:1.

17. Holey graphene nanoplatelets prepared by the method according to claim 1, wherein the plurality of holes having a geometrical structure of hole edges predominantly in a zigzag configuration, and wherein the holey graphene nanoplatelets have a conductivity between about 7000 S/m and about 100,000 S/m.

18. The holey graphene nanoplatelets of claim 17, wherein the holey graphene nanoplatelets have a C:O ratio between 15:1 and 55:1.

19. A product comprising the holey graphene nanoplatelets of claim 17, wherein the product is electrodes of batteries or electrodes of capacitors.

* * * * *